United States Patent
Dai et al.

(10) Patent No.: US 11,711,455 B2
(45) Date of Patent: Jul. 25, 2023

(54) TECHNIQUES TO MANAGE INTEGRITY PROTECTION

(71) Applicant: ZTE Corporation, Guangdong (CN)

(72) Inventors: Qian Dai, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 83 days.

(21) Appl. No.: 17/061,303

(22) Filed: Oct. 1, 2020

(65) Prior Publication Data

US 2021/0084130 A1 Mar. 18, 2021

Related U.S. Application Data

(63) Continuation of application No. PCT/CN2018/082016, filed on Apr. 4, 2018.

(51) Int. Cl.
*H04L 69/327* (2022.01)
*H04W 12/106* (2021.01)
*H04L 9/40* (2022.01)
*H04W 28/02* (2009.01)

(52) U.S. Cl.
CPC ............ *H04L 69/327* (2013.01); *H04L 63/20* (2013.01); *H04W 12/106* (2021.01); *H04W 28/0268* (2013.01)

(58) Field of Classification Search
None
See application file for complete search history.

(56) References Cited

U.S. PATENT DOCUMENTS

| | | | | |
|---|---|---|---|---|
| 10,667,126 | B2 * | 5/2020 | Wifvesson | ............ H04W 12/08 |
| 10,999,787 | B2 * | 5/2021 | Dao | ........................ H04W 8/08 |
| 11,032,712 | B2 | 6/2021 | Vutukuri | |
| 11,129,017 | B2 * | 9/2021 | Tenny | ................... H04W 76/10 |
| 11,490,257 | B2 | 11/2022 | Vutukuri | |
| 11,553,344 | B2 | 1/2023 | Tang | |
| 2015/0381658 | A1 | 12/2015 | Poornachandran et al. | |
| 2016/0374104 | A1 * | 12/2016 | Watfa | .................... H04W 76/23 |
| 2017/0195882 | A1 | 7/2017 | Liao et al. | |
| 2017/0293974 | A1 | 10/2017 | Konduru | |
| 2017/0359749 | A1 | 12/2017 | Dao | |
| 2018/0352482 | A1 | 12/2018 | Gage | |

(Continued)

FOREIGN PATENT DOCUMENTS

| CN | 102142942 A | 8/2011 |
|---|---|---|
| CN | 104244247 A | 12/2014 |

(Continued)

OTHER PUBLICATIONS

Reply LS on Statement on urgency of alignment of ETSI SSP with 3GPP release 15, 3GPP TSG SA #79 SP-180240, Mar. 27, 2018.*

(Continued)

*Primary Examiner* — Jay P Patel
(74) *Attorney, Agent, or Firm* — Perkins Coie LLP

(57) ABSTRACT

Wireless communication methods are described for a user plane integrity protection failure detection and handling, determination and management of integrity protection enabled data rate that exceeds or is close to exceeding a user equipment's capability or threshold, and management of integrity protection or encryption mechanisms in a dual-connectivity system that includes a master network node and a secondary network node.

15 Claims, 15 Drawing Sheets

(56) References Cited

U.S. PATENT DOCUMENTS

| | | | |
|---|---|---|---|
| 2019/0082325 A1* | 3/2019 | Muhanna | H04L 9/3242 |
| 2019/0149993 A1 | 5/2019 | Tenny | |
| 2019/0149997 A1* | 5/2019 | Liao | H04W 12/122 |
| | | | 455/411 |
| 2019/0174449 A1 | 6/2019 | Shan et al. | |
| 2019/0174466 A1 | 6/2019 | Zhang | |
| 2019/0222281 A1* | 7/2019 | Sirotkin | H04L 1/0026 |
| 2019/0230667 A1* | 7/2019 | Loehr | H04L 1/0078 |
| 2019/0261260 A1* | 8/2019 | Dao | H04W 36/0033 |
| 2019/0394651 A1 | 12/2019 | Wifvesson | |
| 2020/0100101 A1* | 3/2020 | Torvinen | H04L 63/0428 |
| 2020/0100102 A1* | 3/2020 | Xu | H04L 9/0822 |
| 2020/0128398 A1* | 4/2020 | Wifvesson | H04W 80/10 |
| 2020/0146077 A1 | 5/2020 | Li | |
| 2020/0154350 A1* | 5/2020 | Dao | H04W 8/08 |
| 2020/0169887 A1 | 5/2020 | Wager | |
| 2020/0260282 A1 | 8/2020 | Tang | |
| 2020/0322804 A1 | 10/2020 | Vutukuri | |
| 2020/0351740 A1* | 11/2020 | Li | H04W 76/19 |
| 2021/0076217 A1 | 3/2021 | Tang | |
| 2021/0084130 A1* | 3/2021 | Dai | G06F 21/64 |
| 2021/0329457 A1 | 10/2021 | Vutukuri | |

FOREIGN PATENT DOCUMENTS

| | | | | |
|---|---|---|---|---|
| CN | 104412673 | A | 3/2015 | |
| CN | 106465100 | A | 2/2017 | |
| CN | 106507348 | A | 3/2017 | |
| CN | 107249202 | A | 10/2017 | |
| CN | 107294723 | A | 10/2017 | |
| EP | 2 528 403 | A1 | 11/2012 | |
| EP | 3709690 | | 9/2020 | |
| WO | 2017076891 | A1 | 5/2017 | |
| WO | 2018/138379 | | 8/2018 | |
| WO | WO-2018167307 | A1 * | 9/2018 | H04L 63/0428 |
| WO | 2019/090492 | | 5/2019 | |

OTHER PUBLICATIONS

ZTE Corporation, et al "Data rate restrictions for user plane integrity protection," 3GPP TSG-RAN WG2 Meeting #100m R2-1712611, Dec. 1, 2017, 3 pages.
3rd Generation Partnership Project, "3GPP TS 23.501 V15.1, Mar. 2018", XP051535222 dated Mar. 27, 2018, 200 pages.
Partial Search Report for EP Application No. 21173678.0, dated Sep. 15, 2021, 17 pages.
Extended Search Report for EP Application No. 21173678.0, dated Dec. 16, 2021, 13 pages.
3GPP SA2, LS response on User Plane Security Policy, 3GPP TSG SA WG3, #91 S3-181123, Apr. 3, 2018, 6 pages.
Huawei, HiSilicon, "Activation/deactivation of the DRB integrity protection", 3GPP TSG RAN WG2 #101 R2-1802798, Feb. 15, 2018, 4 pages.
Japanese Office Action for JP Application No. 2020-553624, dated Nov. 30, 2021, 7 pages with unofficial translation.
3rd Generation Partnership Project "3GPP TS 23.501 V15.1.0, Mar. 2018", XP051535222, 200 pages, dated Mar. 27, 2018.
3rd Generation Partnership Project, "3GPP TS 38.413 V0.7.0, Mar. 2018", XP051450388, dated Mar. 12, 2018, 121 pages.
Extended Search Report for EP Application No. 18913289.7, dated Sep. 14, 2021, 9 pages.
International Search Report and Written Opinion dated Dec. 29, 2018 for International Application No. PCT/CN2018/082016, filed on Apr. 4, 2018 (9 pages).
Co-pending Chinese Office Action for CN Application No. 2020115901453, dated Jan. 4, 2022, 21 pages with unofficial translation.
Co-pending Chinese Office Action for CN Application No. 202110068338, dated Sep. 28, 2021, 13 pages with unofficial translation.
3GPP SA, "Reply LS on Statement on urgency of alignment of ETSI SSP with 3GPP release 15," TSG SA Meeting #SP-79, Chennai, India, SP-180240, 6 pages, Mar. 21-23, 2018.
3GPP SA "Reply LS on Statement on urgency of alignment of ETSI SSP with 3GPP release 15" TSG SA Meeting #SP-79 SP-180240, Mar. 21-23, 2018, Chennai, India, 1 page.
Japanese Decision to Grant for JP Application No. 2020-553624, dated May 31, 2022, 4 pages with unofficial translation.
Qualcomm Inc. "Usage of Data Integrity Protection for DRB in NR"; 3GPP TSG-RAN WG2 R2-1711520; Oct. 9-13, 2017; 2 pages.
Co-Pending Korean Patent Application No. 10-2022-7020614, Office Action dated Feb. 14, 2023, 4 pages with unofficial summary translation.
Decision to Grant for Co-pending EP Application No. 21173678.0, filed Apr. 4, 2018, dated Apr. 6, 2023, 8 pages.
3GPP SA "Technical Specification Group Radio Access Network" Release 15, 3GPP TS 38.413 V0.7.0 (Mar. 2018), 121 pages.
U.S. Final Office Action for U.S. Appl. No. 17/643,129, filed Dec. 7, 2021, dated Apr. 5, 2023, 15 pages.

* cited by examiner

US 11,711,455 B2

TECHNIQUES TO MANAGE INTEGRITY PROTECTION

CROSS REFERENCE TO RELATED APPLICATIONS

This patent document is a continuation of and claims benefit of priority to International Patent Application No. PCT/CN2018/082016, filed on Apr. 4, 2018. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for managing integrity protection and encryption related mechanisms. A first exemplary embodiment comprises detecting, by a first network node, one or more integrity protection failures related to user plane data carried by one or more data radio bearers (DRBs), generating, by the first network node, a failure message, and transmitting, by the first network node, the failure message to a second network node.

In some embodiments of the first exemplary method where the first network node is a user equipment and the second network node is a core network, the failure message is transmitted using a non-access stratum (NAS) signaling technique.

In some embodiments of the first exemplary method, the first network node is a radio access network (RAN) node and the second network node is a user equipment.

In some embodiments of the first exemplary method, the failure message includes at least one of (1) a number of detected integrity protection failures, and (2) one or more reasons for the one or more integrity protection failures. In some embodiments of the first exemplary method, the number of detected integrity protection failures are provided per user equipment, per quality of service (QoS) flow, per packet data unit (PDU) session, per DRB, or per service flow. In some embodiments of the first exemplary method, the one or more reasons include an attack, a packet data convergence protocol (PDCP) counts desynchronization, or a cyclic redundancy check (CRC) bits error.

In some embodiments of the first exemplary method, the failure message is transmitted in response to determining that a number of detected integrity protection failures has reached a predetermined number of failures.

In some embodiments, the first exemplary method further comprises transmitting, by the RAN node, a DRB release message to the user equipment to release the one or more DRBs related to the one or more integrity protection failures.

In some embodiments of the first exemplary method, the first network node is a radio access network (RAN) node and the second network node is a core network.

In some embodiments of the first exemplary method, the core network includes an Access and Mobility Management Function (AMF), a user plane function (UPF), or a session management function (SMF), wherein the failure message is provided to the AMF, the UPF, or the SMF. In some embodiments of the first exemplary method, the AMF receives the failure message and provides the failure message to the SMF or a policy control function (PCF). In some embodiments, the first exemplary method further comprises providing, by the core network, the failure message to a user equipment.

In some embodiments of the first exemplary method, the first network node is a secondary node and the second network node is a master node, wherein the secondary node and the master node operate in a dual connectivity system. In some embodiments, the first exemplary method further comprises transmitting, by the secondary node to the master node, a modification message that includes any one or more of a key refresh, a modification or release of the one or more DRBs, a release of quality of service (QoS) flow, and a release of packet data unit (PDU) session.

A second exemplary method includes a wireless communication method that comprises determining, by a first network node, that a maximum integrity protection enabled data rate threshold or capability of a user equipment has been or will be exceeded, and transmitting, by the first network node to a second network node, a failure indication that informs the second network node that the maximum integrity protection enabled data rate threshold or capability has been or will be exceeded.

In some embodiments of the second exemplary method, the first network node is a radio access network (RAN) node and the second network node is a core network. In some embodiments, the second exemplary method further includes sending, by the RAN node, a message to the core network, wherein the message includes information indicative of any one of: (1) a request to release a connection for the user equipment, modify or release a packet data unit (PDU) session, or modify or release a quality of service (QoS) flow, and (2) a denial of the core network initiated request for a packet data unit (PDU) session addition or a request for a quality of service (QoS) flow addition.

In some embodiments of the second exemplary method, the core network includes an Access and Mobility Management Function (AMF), a session management function (SMF), a policy control function (PCF), or a user plane function (UPF). In some embodiments of the second exemplary method, the failure indication provided to the AMF is sent to the SMF. In some embodiments of the second exemplary method, the failure indication provided to the SMF is sent to the PCF.

A third exemplary method includes a wireless communication method that comprises receiving, by a secondary node from a master node, an integrity protection data rate threshold for a user equipment, and controlling an integrity protection enabled data rate to be less than or equal to the integrity protection data rate threshold, wherein the integrity protection enabled data rate is allocated to the user equipment on one or more data radio bearers (DRBs) terminated at the secondary node.

A fourth exemplary method includes a wireless communication method that comprises performing, by a base station, a packet data unit (PDU) session setup comprising one or more PDU sessions, wherein during or before the PDU session setup the base station receives from a core network or a user equipment at least one of: a resource allocation priority or admission priority for each PDU session, a security priority for each PDU session, a user security preference, and a user preference between security and quality of service (QoS) level.

In some embodiments of the fourth exemplary method, the user security preference is indicated for each PDU session or for each QoS flow, and the user preference between security and QoS level is indicated for each PDU session or for each QoS flow.

In some embodiments of the fourth exemplary method, the base station is a radio access network (RAN) node.

A fifth exemplary method includes a wireless communication method that comprises receiving, by a secondary node from a master node, a user plane security policy for each of one or more packet data unit (PDU) sessions assigned to the secondary node, wherein the user plane security policy is configured by a core network, determining, by the secondary node for the one or more PDU sessions or for one or more QoS flows of each PDU session or one or more DRBs, any one or more of (1) an integrity protection activation or deactivation, and (2) an encryption activation or deactivation, wherein the determining is performed based on the user plane security policy, and transmitting, by the secondary node to the master node, a feedback that includes one or more decisions related to activation or deactivation by the secondary node.

In some embodiments of the fifth exemplary method, the feedback includes a list of identifiers of one or more PDU sessions or one or more QoS flows or one or more DRBs terminated on the secondary node, wherein each identifier is associated with information about any one or more of (1) the integrity protection activation or deactivation, and (2) the encryption activation or deactivation.

In some embodiments, the fifth exemplary method further includes transmitting, by the secondary node to a user equipment, the one or more decisions. In some embodiments of the fifth exemplary method, the one or more decisions are transmitted to the user equipment using SRB3 signaling.

A sixth exemplary method includes a wireless communication method that comprises receiving, by a base station from a core network, a user plane security policy for a user equipment, determining, by the base station for one or more PDU sessions or for one or more QoS flows of each PDU session, any one or more of (1) an integrity protection activation or deactivation, and (2) an encryption activation or deactivation, wherein the determining is performed based on the user plane security policy, and transmitting, by the base station to the core network, a feedback that includes one or more decisions related to activation or deactivation by the base station.

In some embodiments, the sixth exemplary method further includes changing, by the base station, for the one or more PDU sessions or for the one or more QoS flows of each PDU session, any one or more of (1) the integrity protection activation or deactivation, and (2) the encryption activation or deactivation, and transmitting, by the base station to the core network, a feedback that includes one or more updated decisions related to the changed activation or deactivation by the base station.

In some embodiments of the sixth exemplary method, the base station is a radio access network (RAN) node.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

This patent document first provides an overview of some of the issues associated with the current integrity protection mechanisms. Next, the patent document describes a new radio (NR) dual-connectivity architecture. Thereafter, the patent document describes various solutions associated with three issues. At least some of the solutions for the first issue generally relate to a user plane (UP) integrity protection failure detection and handling. At least some of the solutions for the second issue generally relate to handling when a data rate of integrity protection processing exceeds the UE's capability. And, at least some of solutions for the third issue generally relate to handing of integrity protection mechanisms in a dual-connectivity system. The example headings for the various sections below are used to facilitate the understanding of the disclosed subject matter and do not limit the scope of the claimed subject matter in any way. Accordingly, one or more features of one example section can be combined with one or more features of another example section.

Integrity protection and encryption are used in LTE and NR to protect the security of signaling and data. In current LTE specification, the signaling radio bearer (SRB) 1 and 2 can be encrypted and integrity protected, the data radio bearers (DRBs) can be encrypted, and no integrity can be used for data radio bearers (DRB) except for the backhaul data link of Relay node. Currently, integrity protection and encryption are both enabled for SRB (signaling radio bearer) 1, 2, 3 and DRBs (data radio bearers).

Integrity processing for DRB can be a computationally intensive process for a user equipment (UE), such as a cellphone, a smartphone, or a laptop. To reduce at least some complexity, one UE capability is introduced to classify a maximum data rate for the UE to enable integrity protection processing. The minimum value of the maximum data rate of this capability can be 64 kBps. This capability can be sent by the UE to the network during the connection establishment so that the network can determine that the aggregated integrity protected data rate does not exceed the UE's capability. However, the techniques related to a determination of whether an integrity protected data has does not exceed the UE's capability have not been adequately developed. Furthermore, in a NR system, if a receiving network node, such as a user equipment, detects that data packet delivered in one data radio bearer fails the integrity check, techniques have not been adequately developed to manage such an issue at the UE side and the network side.

Figure 1A:
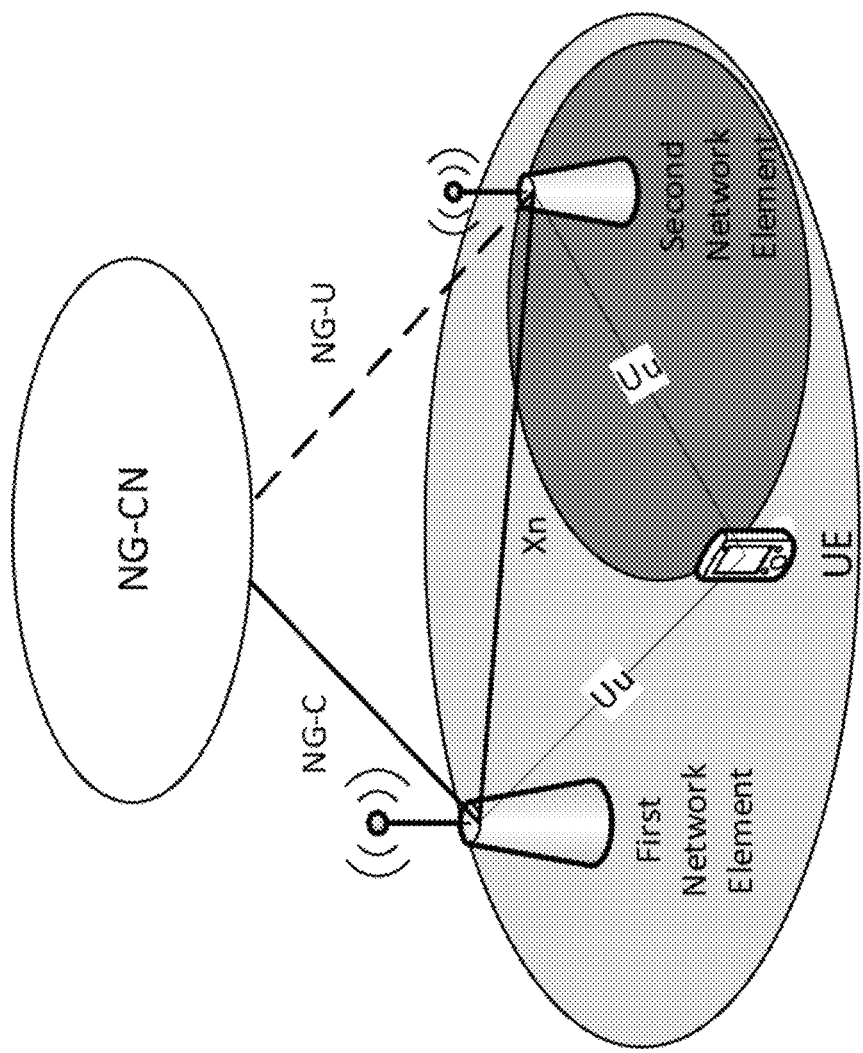
FIG. 1A shows an example of a dual connectivity (DC) system architecture for a New Radio (NR) system.

FIG. 1A shows an example of a dual connectivity (DC) system architecture for a NR system. In the DC system, a UE can have multiple transceiver, such as multiple receivers (Rx) or transmitters (Tx). The current serving base station of the UE, such as the first network element shown in FIG. 1A, may select a suitable wireless channel for the UE. As an example, the first network element can select a wireless channel with a quality that meets or exceeds a certain threshold. In a DC system, a second base station such as a second network element in FIG. 1A can also communicate with the UE so that the two base stations can jointly provide radio resources for the UE to perform user plane data transmission. The wireless or radio interface between the UE and the first and second network elements are shown as Uu in FIG. 1A.

Further, a wired interface is shown in FIG. 1A between the first network element and the next generation core network (NG-CN) so that a first NG control plane NG-C can be established between the first network element and the NG-CN. Another wired interface is shown in FIG. 1A between the second network element and the NG-CN so that a second NG user plane NG-U can be established between the second network element and the NG-CN for the UE. The wired interface, the first network element and the second network element are connected by an ideal or non-ideal inter network element interface called an Xn interface. In terms of a wireless interface, the first network element and the second network element may provide the same or different Radio Access Technology (RAT), and may provide relatively independent scheduling of UEs.

The first network element connected to the control plane of the core network can also be called the master node. The second network element can also be called a secondary or slave node. If the UE is connected to more than two network elements, all nodes except the master node can be called secondary nodes. In a dual connectivity system, a master node (MN) can have one user plane (UP) connection and control plane (CP) connection with the core network, and the secondary node (SN) can have either one UP connection with core network or no UP connection with core network. In such a case, the SN has a UP connection with MN so that the data of SN can transmitted between the user equipment and the SN, between the SN and the MN, and between the MN and the CN. Thus, the MN has a UP connection with CN.

The exemplary system of FIG. 1A describes a MR (Multi-RAT) dual connection architecture. The master node and the secondary node can be access points of different radio access technologies. For example, one access point can include a NR or radio access network (RAN) node, such as a gNB, and another access point can include an LTE RAN node, such as a eNB. In some implementations, the eNB and the gNB can be connected to a 5G core network at the same time. In some other embodiments, a dual connectivity can be implemented by using a primary node and a secondary node that are both NR RAN nodes, such as gNBs.

The integrity protection issues mentioned above also exists for a dual connection system. For example, techniques are not adequately developed for a RAN with dual-connection architecture to determine whether an integrity enabled data rate of a UE does not exceed the UE capability. Furthermore, techniques have not been adequately developed for a UE side processing and a network side processing when a DRB integrity check failure is detected.

I. Issue 1—User Plane (UP) Integrity Protection (IP) Failure Detection and Handling.

Solution 1

Figure 2:
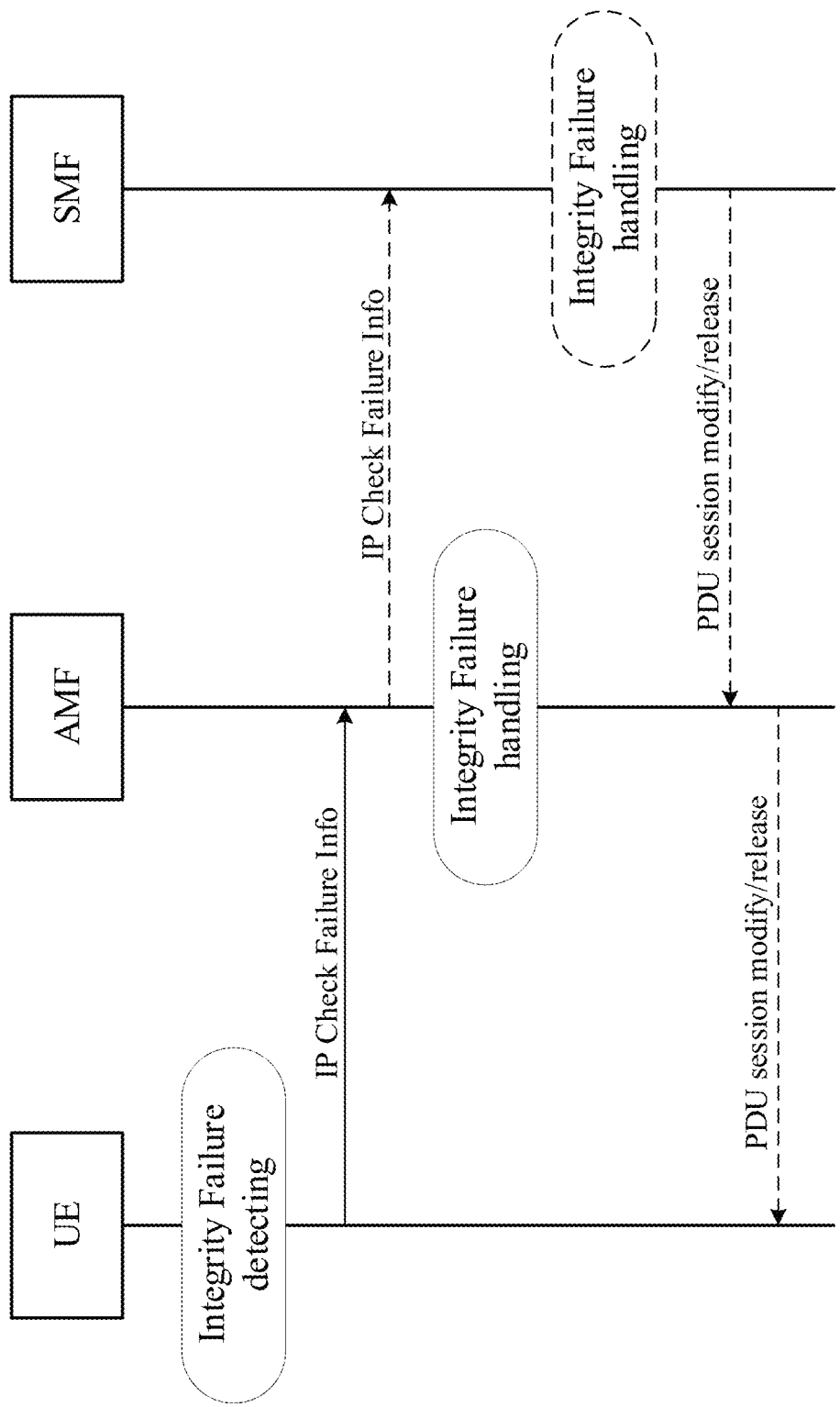
FIG. 2 shows a flow diagram of an example solution for a User plane (UP) Integrity Protection (IP) failure detection and handling.

FIG. 2 shows a flow diagram of an example solution for a UP IP failure detection and handling. In FIG. 2, access and mobility management function (AMF) and session management function (SMF) are related to and included in a core network. In some embodiments, the CN can also include a user plane function (UPF). UPF can be used to handle the UP connection from UE to the Data Network, such as routing and forwarding the data packets or QoS handling.

Figure 1B:
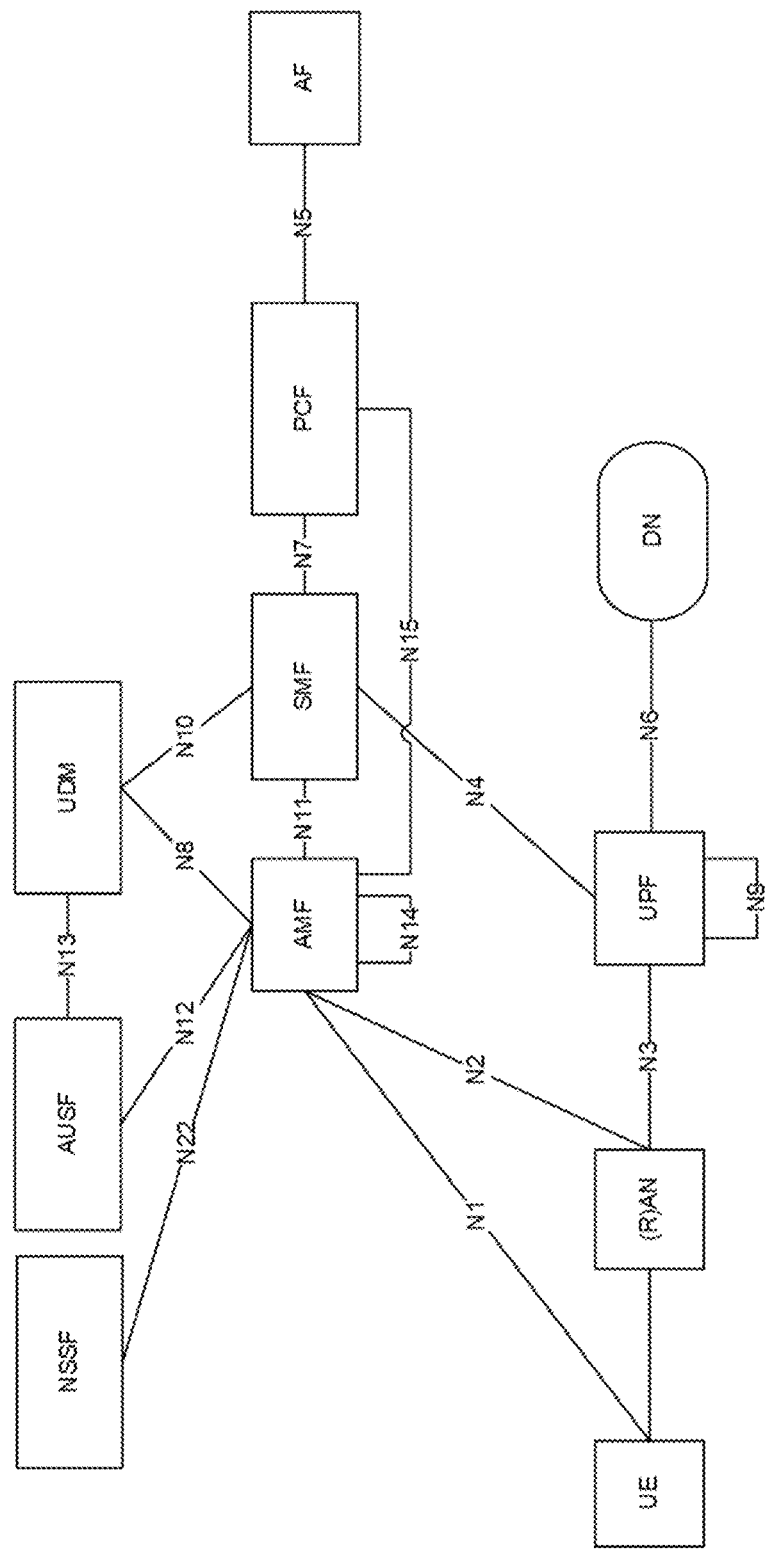
FIG. 1B shows an example of a block diagram of a wireless network structure.

FIG. 1B shows an example of a block diagram of a wireless network structure. In FIG. 1B, the UE can communicate with the AMF of the CN and also with the RAN node. The AMF, SMF, Policy Control Function (PCF), and User Plane Function (UPF) are CN related functions. In FIG. 1B, the interface between the network functions are denoted with a letter N followed by a number.

For Solution 1, if UE detects UP IP failure in any one or more DRBs, UE can inform of this failure to any one or more of the CN related functions described in this patent document, or to the service provider, or to the application server. UE can inform the CN about the integrity failure using NAS signaling. The failure information generated and sent by the UE can include at least one or both of the following: (1) a number of detected failures with the granularity of per UE, or per quality of service (QoS) flow, or per packet data unit (PDU) session, or per service flow, or (2) a reason for the failure, such as by attack, or by packet data convergence protocol (PDCP) counts desynchronization, or cyclic redundancy check (CRC) bits error.

In some embodiments related to DC, the UE can detect UP IP failure in any one or more DRB terminated at a master node (MN) or a secondary node (SN). In some embodiment, the UE can generate and send the failure information to the CN when an integrity protection failure is detected. In some other embodiments, the UE can generate and send the information related to failure detection when a detected number of accumulated or consecutive failures reaches a certain pre-determined number.

The following paragraph(s) provides additional information related to Solution 1.

In some embodiments, a UE can check the integrity of data packets of each DRB. When an integrity error is found, the UE can generate and send an integrity check failure information to a CN function, such as an access and mobility management function (AMF). Optionally, the UE may generate and send an integrity check failure information to a function in the CN when a UE detected accumulated or consecutive failures reaches to a certain number. The integrity check failure information can include at least one or more of the following information:

(1) The identities of one or more QoS flows that failed the integrity check, and/or a corresponding number of failures associated with each QoS flow.
(2) The identities of the one or more PDU sessions that failed the integrity check and/or a corresponding number of failures of each PDU session.
(3) One indication to express that the UE has detected a user plane integrity check failure.
(4) A total number of the user plane integrity check failure.
(5) A reason for the cause of the failure, e.g. by attack, or by PDCP counts de-synchronization, or CRC bits error.
(6) A number of user plane integrity check failure for each corresponding QoS flow, or for each corresponding PDU session, or for each corresponding DRB.

The number of the user plane integrity check failure can be counted in a certain length of time window, which can be defined by the RAN node and which can be configured to the UE. The UE can provide failure information to the AMF via NAS signaling.

After receiving the integrity check failure information, the AMF can either deliver this information to the SMF or to the PCF, or to both the SMF and the PCF.

In some embodiments, if the SMF receives the integrity check failure information, the SMF can decide how to handle this failure. For example, the SMF can modify or release the PDU session or QoS flow that failed the integrity check and send corresponding signaling to the AMF. In some embodiments, the AMF can handle the failure information by itself. For example, a AMF can modify or release the PDU session or QoS flow that failed the integrity check and the AMF can send a corresponding signaling to the UE. In some embodiments where the PCF receives the failure information, the PCF can determine whether to release a PDU session or a QoS flow if integrity failure is found. In such embodiments, PCF can decide the UE security policy.

Solution 2

Figure 3:
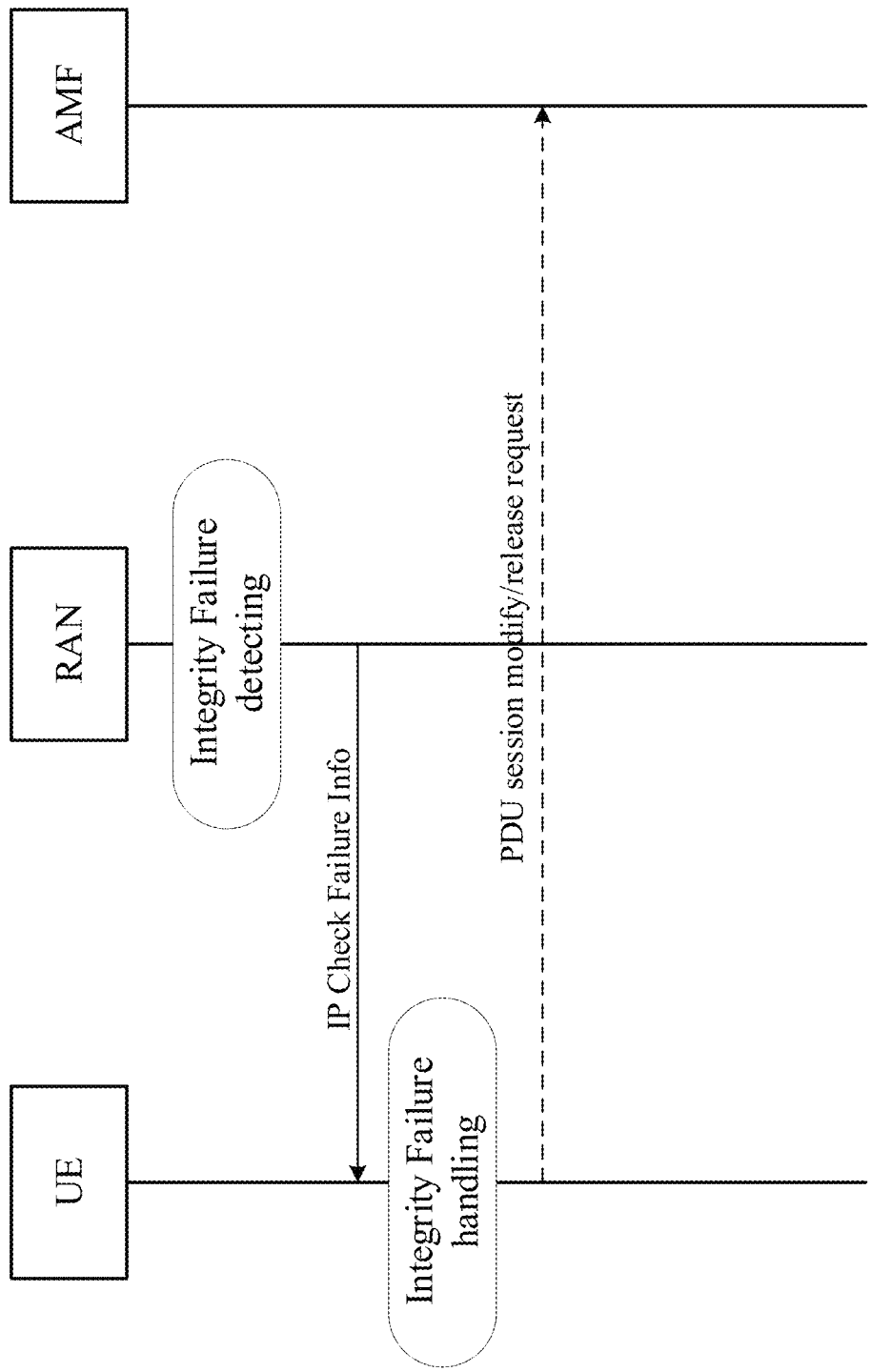
FIG. 3 shows a flow diagram of another example solution for a UP IP failure detection and handling.

FIG. 3 shows a flow diagram of another example solution for a UP IP failure detection and handling. In FIG. 3, if a RAN node, such as a base station or a eNB, detects UP IP failure, then the base station can generate and send the failure information to the UE. If UE receives the UP IP failure information from the RAN node, the UE can deliver the failure information to its upper layer, such as a NAS layer or an application layer. In some embodiments that relate to DC, if UE receives the UP IP failure information from the MN or SN, then UE deliver this info to its upper layer, e.g. NAS layer or application layer.

In some embodiment, the RAN node can generate and send the failure information to the UE when an integrity protection failure is detected. In some other embodiments, the RAN node can generate and send the information related to failure detection when a detected number of accumulated or consecutive failures reaches a certain pre-determined number.

The information sent by the RAN node can include at least one or both of the following: (1) a number of detected failures with the granularity of per UE, or per QoS flow, or per PDU session, or per service flow, or (2) a reason for the failure, such as by attack, or by PDCP counts desynchronization, or CRC bits error.

Optionally, a RAN node can send a DRB release message to the UE to release the DRBs that failed the integrity check. The DRB release message can include a cause value of "integrity check failure" or "user plane integrity check failure."

The following paragraph(s) provides additional information related to Solution 2.

In some embodiment, a RAN node can check the integrity of data packets of each DRB. After an integrity error is found, the RAN node can send an integrity check failure information to the UE. Optionally, the RAN node can send an integrity check failure information to the UE when the RAN node detected accumulated or consecutive failures reaches a certain number.

The integrity check failure information can include at least one (or more than one) of the following information:

(1) The identities of the one or more QoS flow which failed the integrity check, and/or the corresponding number of failures of each QoS flow;
(2) The identities of the one or more PDU sessions which failed the integrity check and/or the corresponding number of failures of each PDU session;
(3) The identities of the one or more DRBs which failed the integrity check, and/or the corresponding number of failures of each DRB;
(4) One indication to express that user plane integrity check failures are detected.
(5) A total number of the detected user plane integrity check failure.
(6) A length of the time window used to count the number of the detected user plane integrity check failure.
(7) A reason for the cause of the user plane integrity check, e.g. by attack, or by PDCP Counts de-synchronization, or CRC bits error.
(8) A number of user plane integrity check failure for each corresponding QoS flow, or for each corresponding PDU session, or for each corresponding DRB.

The number of the user plane integrity check failure can be counted in a certain length of time window, which can be defined by the RAN node. That RAN node can provide the failure information to the UE via RRC signaling.

Optionally, in some other embodiments, the RAN node may not send an integrity check failure information to the UE to inform the UE about the IP failure. In such embodiments, the RAN can send a message of releasing DRB to UE to release the DRBs which failed the integrity check. Such a message sent by the RAN node can include or attach a cause with a value associated with "integrity check failure" or "user plane integrity check failure." The message can be a RRC connection Reconfiguration message which is currently used in LTE and NR system.

After the UE receives the integrity check failure information, the UE can perform additional operations based on the integrity check failure information. For example, the UE can initiate PDU session modify or release request procedure to request the CN to modify or release existing PDU sessions or QoS flows which failed integrity check.

Solution 3

Figure 4:
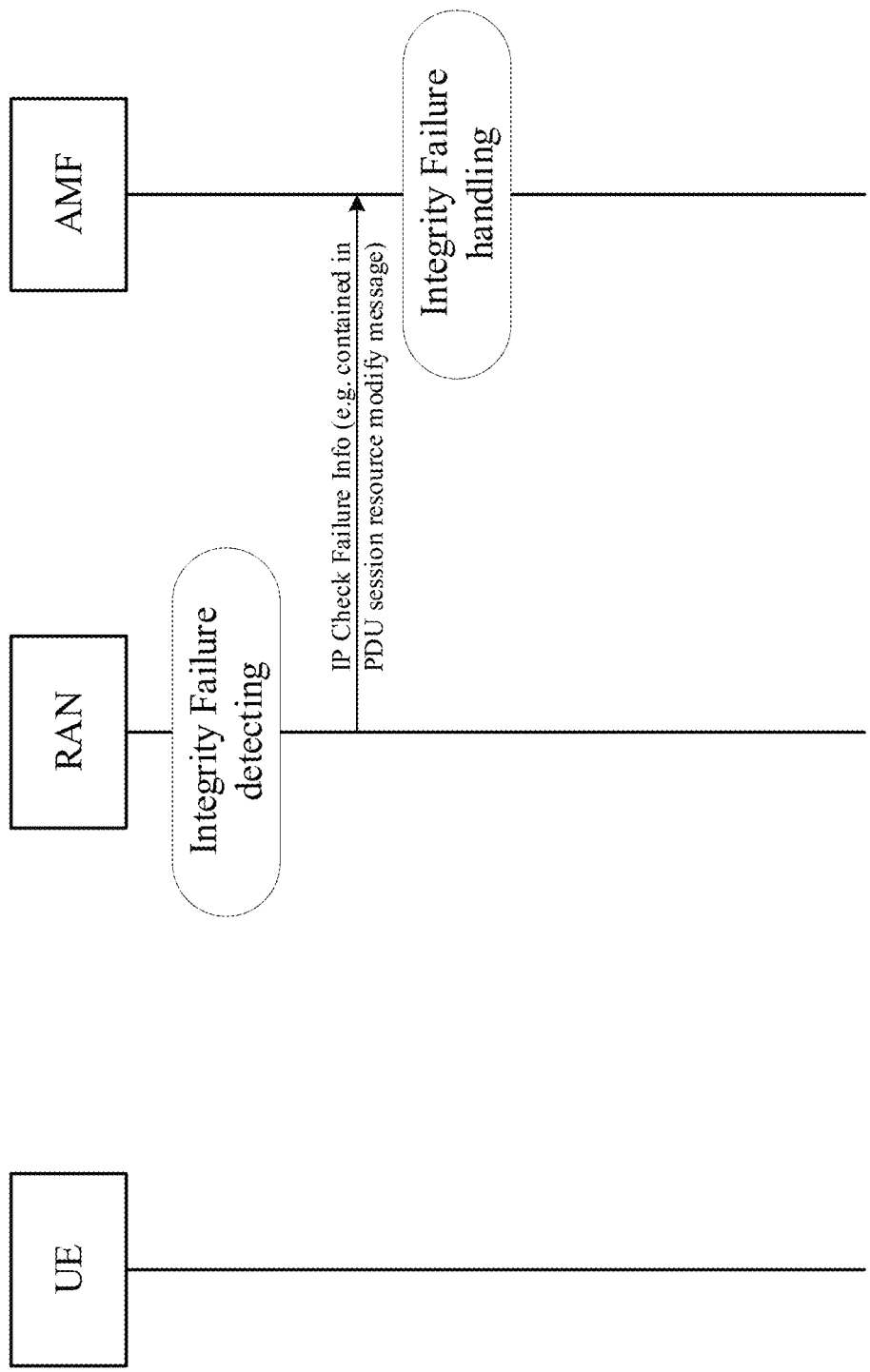
FIG. 4 shows a flow diagram of another example solution for a UP IP failure detection and handling.

FIG. 4 shows a flow diagram of another example solution for a UP IP failure detection and handling. In FIG. 4, if a RAN node detects a UP IP failure or receives UP IP failure info from the UE, the RAN node can generate and send the failure information to CN. The CN node can be or can include an access and mobility management function (AMF), a session management function (SMF), a Policy Control Function (PCF), or a user plane function (UPF).

In some embodiment, the RAN node can request the CN to modify or release PDU sessions or QoS flows or UE connection by sending a failure message to the CN with a cause of "integrity check failure" or "user plane integrity check failure." One benefit of sending such information to the CN is that the CN can know that an IP failure has been detected and the PDU sessions or QoS flows associated with the IP failure.

In some embodiments, a current signaling technique can be used to send the failure information from the RAN node to the AMF. Some examples of a signals used to send messages from the RAN node to AMF include PDU Session Resource Notify, PDU Session Resource Modify Indication, or UE Context Release Request.

The following paragraph(s) provides additional information related to Solution 3.

In some embodiments, a RAN node can check the integrity of data packets of each DRB. After an integrity error is found, the RAN node send an UP IP failure information to the AMF. The UP IP failure information can be delivered in an existing message to save the control signaling overhead. An example of an existing message can include PDU Session Resource Notify.

The UP IP failure information can include at least one (or more than one) of the following information:

(1) The identities of the one or more QoS flow which failed the integrity check, and/or the corresponding number of failures of each QoS flow.
(2) The identities of the one or more PDU session which failed the integrity check and/or the corresponding number of failures of each PDU session.
(3) The identities of the one or more DRB which failed the integrity check, and/or the corresponding number of failures of each DRB.
(4) One indication to express that user plane integrity check failures are detected.
(5) The total number of the detected user plane integrity check failure.
(6) The length of the time window used to count the number of the detected user plane integrity check failure.
(7) A reason for the cause of the user plane integrity check failure, e.g. by attack, or by PDCP Counts de-synchronization, or CRC bits error.
(8) A number of user plane integrity check failure for each corresponding QoS flow, or for each corresponding PDU session, or for each corresponding DRB.

Optionally, in some embodiments, the RAN node can use a simpler mechanism to deliver the UP IP failure information to the AMF. For example, a RAN node can request the CN to modify or release PDU sessions or QoS flows or UE connection with a cause of "integrity check failure" or "user plane integrity check failure." In such embodiments, the CN can determine that an IP failure happened and which PDU sessions or QoS flows have suffered. For example, a RAN node can send a PDU Session Resource Modify Indication message to the AMF to ask for modification or releasing of the IP check failed PDU session or QoS flow with a cause as mentioned above. As another example, a RAN node can send a UE Context Release Request message to the AMF to ask for releasing the UE connection with a cause as mentioned above.

In some embodiments, the AMF also can relay the UP IP failure information to the SMF or PCF or both the SMF and PCF as described in Solution 1.

After a CN receives the integrity check failure information, the CN, which can include AMF or SMF or PCF, can perform additional operations based on the integrity check failure information. For example, a CN can initiate PDU session modify or release request procedure to request the RAN to modify or release existing PDU sessions or QoS flows which failed integrity check.

Solution 4

Figure 5:
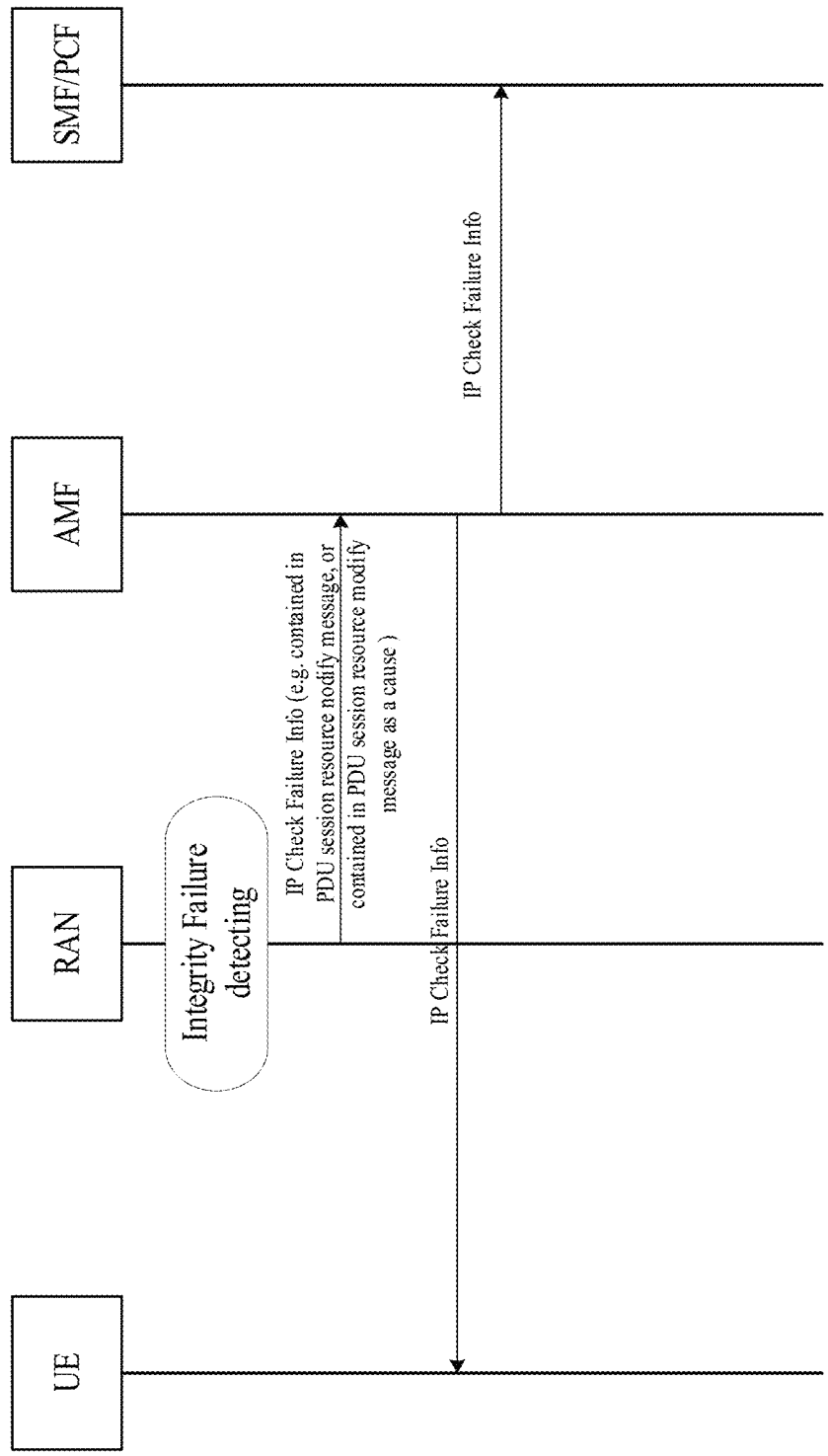
FIG. 5 shows a flow diagram of another example solution for a UP IP failure detection and handling.

FIG. 5 shows a flow diagram of another example solution for a UP IP failure detection and handling. In FIG. 5, if a CN receives a UP IP failure information from the RAN node, then the CN can inform the UP IP failure to the UE. The RAN node can send the failure information to one or more CN functions using NAS signaling. For example, the CN functions can include, an AMF, a SMF, a PCF, or a UPF. In some embodiments, if AMF of CN receives the UP IP failure information from the RAN node, then the AMF can deliver the failure information to the SMF or the PCF.

The information sent by the RAN node can include at least one or both of the following: (1) a number of detected failures with the granularity of per UE, or per QoS flow, or per PDU session, or per service flow, or (2) a reason for the failure, such as by attack, or by PDCP counts desynchronization, or CRC bits error.

The following paragraph(s) provides additional information related to Solution 4.

In some embodiment, a UP IP failure can be detected by a RAN node, and the RAN node can send the UP IP failure info to the AMF. After the AMF receives the UP IP failure information, the AMF can deliver this failure information to UE, for example, using NAS signaling. The failure information can include at least one (or more than one) of the following:

(1) The identities of the one or more QoS flow which failed the integrity check, and/or the corresponding number of failures of each QoS flow.
(2) The identities of the one or more PDU sessions which failed the integrity check and/or the corresponding number of failures of each PDU session.
(3) The identities of the one or more DRB which failed the integrity check, and/or the corresponding number of failures of each DRB.
(4) One indication to express that user plane integrity check failures are detected.
(5) The total number of the detected user plane integrity check failure.
(6) The length of the time window used to count the number of the detected user plane integrity check failure.
(7) A reason for the cause of the user plane integrity check failure, e.g. by attack, or by PDCP counts de-synchronization, or CRC bits error.
(8) A number of user plane integrity check failure for each corresponding QoS flow, or for each corresponding PDU session, or for each corresponding DRB.

In some embodiments, after the AMF receives the UP IP failure information, the AMF can also deliver this failure information to SMF or UPF.

Solution 5

Figure 6:
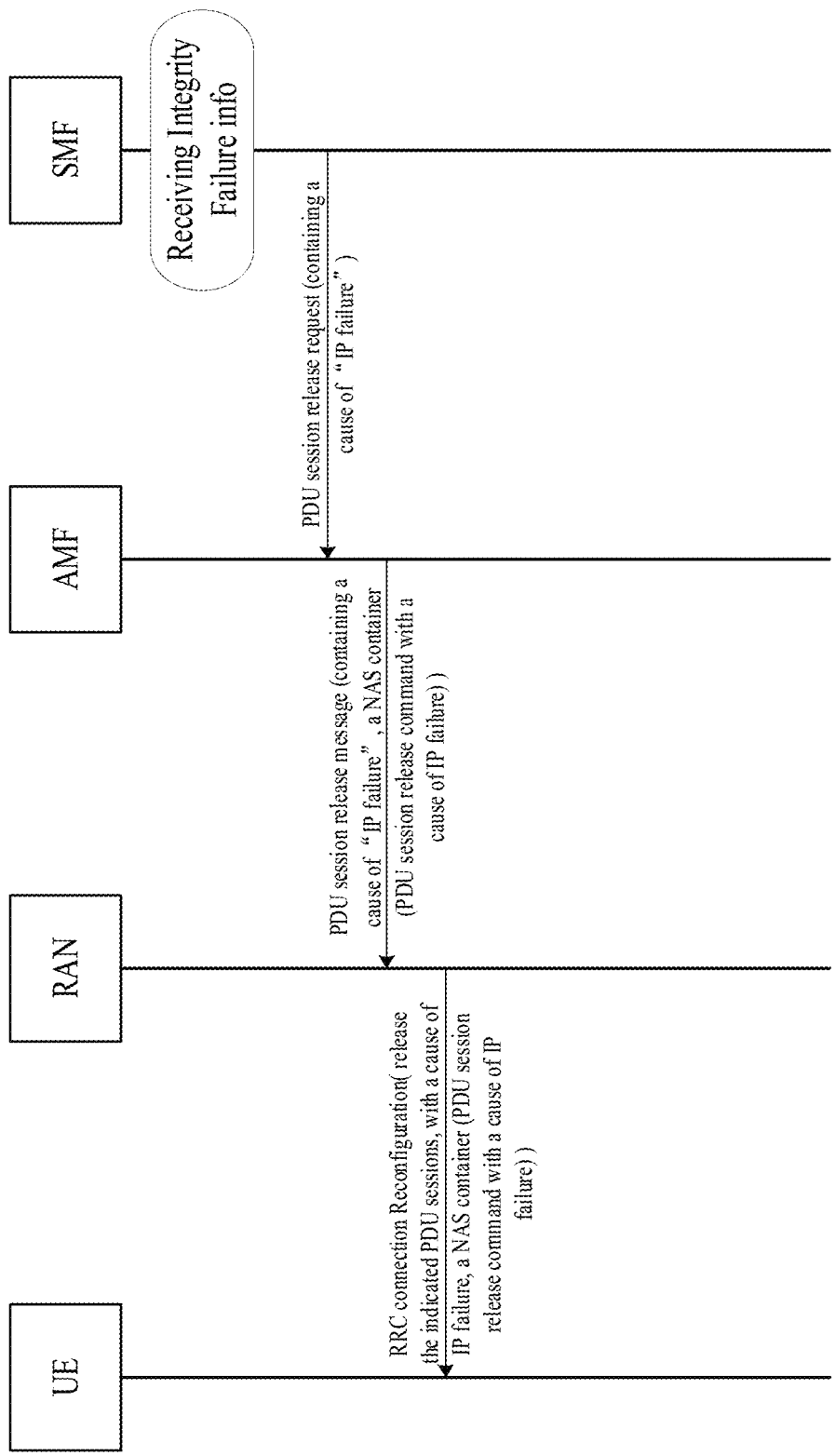
FIG. 6 shows a flow diagram of another example solution for a UP IP failure detection and handling.

FIG. 6 shows a flow diagram of another example solution for a UP IP failure detection and handling. In FIG. 6, if a CN receives the IP failure information from a RAN node or from a UE, then the CN can send a request message to the RAN node or directly to the UE to release the UE connection or release PDU sessions or QoS flows. As shown in FIG. 6, if the request message sent to the RAN node, the RAN node can send the request message to the UE. The request message can include a cause of "integrity check failure" or "user plane integrity check failure."

The following paragraph(s) provides additional information related to Solution 5.

In some embodiments, the SMF or PCF can receive the IP failure information that indicate the one or more PDU sessions or one or more QoS flows of a given UE that failed integrity check. In such embodiments, the SMF can initiate a PDU session release request procedure to release the IP failed PDU sessions or QoS flows. SMF can send to the AMF a PDU session release request with a cause of "integrity check failure" or "user plane integrity check failure."

Optionally, in some embodiments, an SMF or a PCF can send a UE connection or context release request to AMF to ask release the entire UE connection in case all the PDU sessions or QoS flows of the given UE are facing IP failure. The UE connection or context release request message can include a cause of "integrity check failure" or "user plane integrity check failure."

Upon receiving PDU session release request from the SMF, the AMF can send to a RAN node a PDU session release request to the RAN node with a cause of "integrity check failure" or "user plane integrity check failure." Alternatively, in some embodiments, AMF can send a NAS message to UE to inform the UE to release the PDU sessions or QoS flows which failed IP check. The NAS message can include a cause of "integrity check failure" or "user plane integrity check failure." The NAS message can be included in the request message as a NAS container sent from AMF to RAN. Since, the AMF and UE lack a direct interface, the RAN node can relay the NAS message from the AMF to the UE. The relaying method can encapsulate the NAS message, for example, in a NAS container in the AMF to RAN node message and RAN node to UE message. Thus, the content of NAS message can be transparent to the RAN node.

Optionally, in some embodiments, the AMF can send a UE context release request to the RAN node to release the entire UE connection. The UE context release request message can include a cause of "integrity check failure" or "user plane integrity check failure."

In some embodiments, after the RAN node receives the PDU session release request from the AMF, the RAN node can send PDU session release request to the UE with a cause of "integrity check failure" or "user plane integrity check failure." If a NAS container is included in the received PDU session release request from the AMF, then the RAN node can transparently deliver this NAS container to the UE via RRC signaling.

Solution 6

Figure 7:
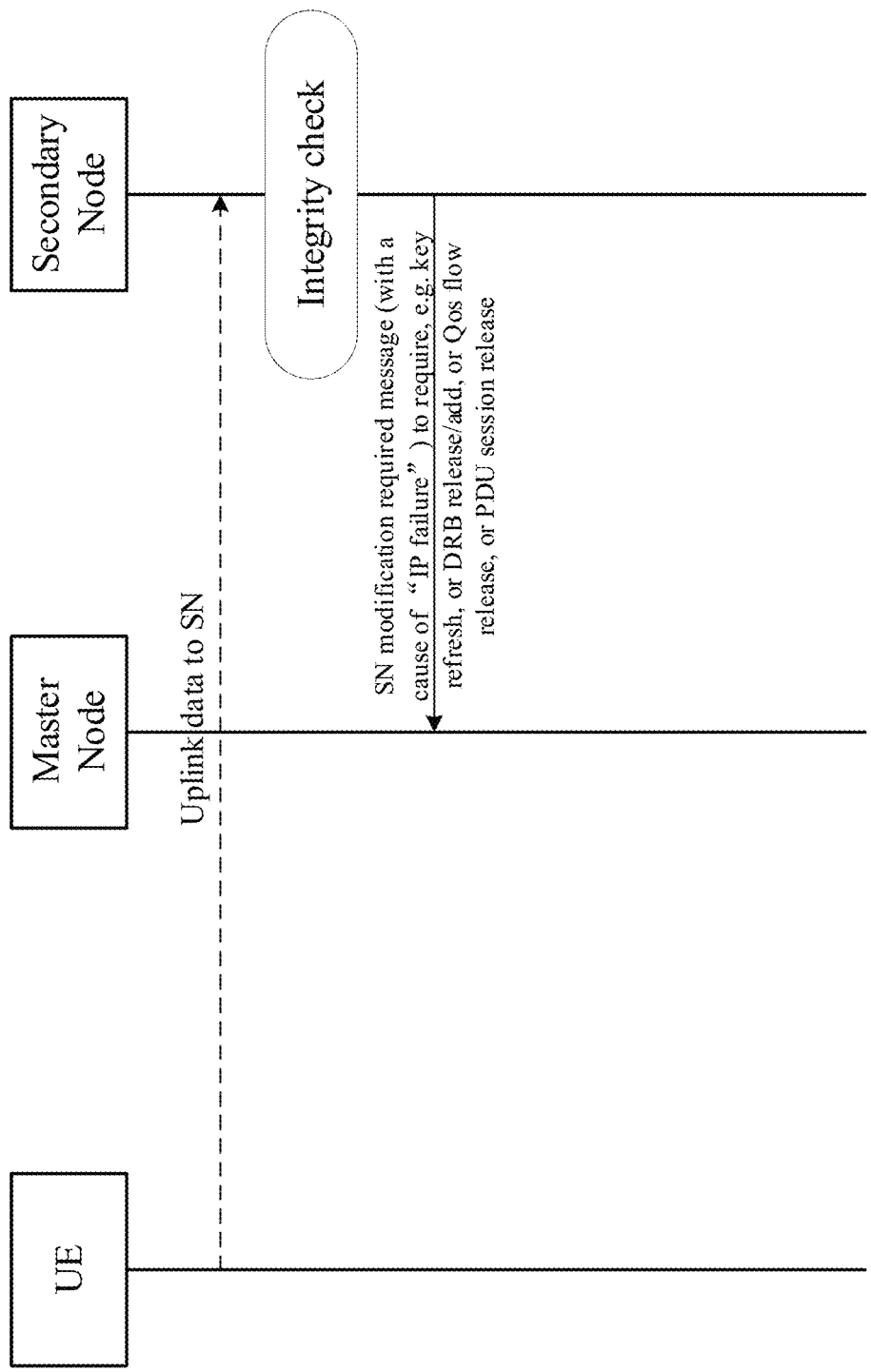
FIG. 7 shows a flow diagram of another example solution for a UP IP failure detection and handling in a dual-connectivity system.

FIG. 7 shows a flow diagram of another example solution for a UP IP failure detection and handling in a dual-connectivity system. In FIG. 7, if a secondary node (SN) detects the IP failure, the SN can generate and send a failure message to the master node (MN). The MN and SN can have established connections or can communicate with the same user equipment. The message can include, for example, a key refresh, modify or release of a DRB, a modify or release of a PDU session, or a modify or release of a QoS flow. The modification message can include a cause of "integrity check failure" or "user plane integrity check failure." In some embodiments, as shown in FIG. 7, the SN can use existing message such as SN initiated SN modification required message to send the above described message to the MN.

The following paragraph(s) provides additional information related to Solution 6.

In some embodiments that relate to a dual-connectivity system, for example, where a UE has two connections with a MN and a SN in the same time, the MN can include a NR-RAN-node and the SN can include a eLTE-eNB. The SN can check the integrity of the uplink data transmitted from UE to the SN, if IP failure is detected in a DRB terminated at SN, then SN can perform additional operations. For example, a SN can inform the UP IP failure information to MN. In some embodiments, UP IP failure information can include at least (or more than one) of the following information:

(1) The identities of the one or more QoS flow which failed the integrity check, and/or the corresponding number of failures of each QoS flow.

(2) The identities of the one or more PDU sessions which failed the integrity check and/or the corresponding number of failures of each PDU session.

(3) The identities of the one or more DRB which failed the integrity check, and/or the corresponding number of failures of each DRB.

(4) One indication to express that user plane integrity check failure is detected.

(5) The total number of the detected user plane integrity check failure.

(6) The length of the time window used to count the number of the detected user plane integrity check failure.

(7) A reason for the cause of the user plane integrity check failure, e.g. by attack, or by PDCP counts de-synchronization, or CRC bits error.

(8) A number of user plane integrity check failure for each corresponding QoS flow, or for each corresponding PDU session, or for each corresponding DRB.

Optionally, in some embodiments, a SN can directly initiate a SN modification procedure. For example, a SN can send a SN modification required message which can include a cause of "integrity check failure" or "user plane integrity check failure"

Solution 22

In some embodiments, a UE may check the integrity of data packets of each DRB. When an integrity error is detected by the UE, the UE can determine whether to trigger a radio link failure. The UP IP related triggering condition of the radio link failure can include at least one of the following:

(1) Consecutive integrity check failures are detected on one DRB and the number of failures reaches a certain pre-defined threshold.

(2) The accumulated detected integrity check failures on one DRB within a configured time length reaches a certain pre-defined threshold.

(3) The accumulated detected integrity check failures on all the DRBs within a configured time length reaches a certain pre-defined threshold.

In embodiments that involve a single-connection, for example, where the UE connects to one RAN node, if the UE generates a radio link failure report due to DRB IP failure, a cause of 'UP integrity check failure' or 'DRB integrity check failure' can be indicated in the radio link failure report. Further, in some embodiments, UE can send the radio link failure report to RAN when the radio connection is recovered such as when the UE can normally transmit or receive message to or from the RAN node. For example, a UE can send a response message including the radio link failure report to the RAN node when the UE receives an uplink information request message from the RAN node.

In some embodiments that relate to a dual connectivity system, if UE determines that there is an IP failure on the MN terminated DRBs and the radio link failure triggering condition is reached, then the UE can perform the operations described above for single-connection embodiments.

In some embodiments that relate to a dual connectivity system, if UE determines that there is an IP failure on the SN terminated DRBs and the radio link failure triggering condition is reached, then the UE can generate a SN failure information message that includes a failure type of 'UP integrity check failure' or 'DRB integrity check failure' and send the message to the MN. In such embodiments, the MN can determine the operation(s) to perform with the SN. For example, the MN can change to a new SN or release the SN.

II. Issue 2—Operations to Determine and Manage a Data Rate of Integrity Protection Processing Exceeding the UE's Capability or Threshold.

Solution 7

In some embodiments, a RAN node can determine and inform a CN that a UE's capability or supported maximum integrity protection enabled data rate has been exceeded, or is close to exceeding (or will be exceeded). As an example, a determination can be made that the maximum integrity protection enabled data rate is close to exceeding based on a percentage that describes the relationship between the current IP enabled data rate and the maximum IP enabled data rate. In some embodiments, the UE's capability can be a static maximum integrity protection enabled data rate. In some other embodiments, the UE supported maximum integrity protection enabled data rate can be a dynamically configured or changed as a threshold value. The RAN can determine whether an integrity protection enabled data rate of a UE has exceeded or is close to exceeding a maximum integrity protection enabled data rate threshold or capability of the UE. The CN can be or can include a AMF, a SMF, a PCF, or a UPF. In some embodiments, the RAN node can send to the AMF information about whether the UE's maximum integrity protection enabled data rate has been exceeded or is close to being exceeded. In such embodiments, the AMF can send the information to the SMF and the SMF can send the information to the PCF. In some embodiments, since UPF and RAN has a direct interface (e.g., the N3 interface shown in FIG. 1B), the UPF can be informed by RAN node whether the UE's maximum integrity protection enabled data rate has been exceeded or is close to being exceeded.

The following paragraph(s) provides additional information related to Solution 7.

In some embodiments, a RAN node can calculate an aggregated IP enabled data rate of a given UE. If a RAN node determines that the calculated result exceed the UE capability or supported maximum IP enabled data rate, or if the RAN node determines that the calculated result is close to being exceed, then the RAN node can provide this information to the CN, for example, the AMF or SMF. For example, the RAN node can send to AMF a signaling, such as a PDU session resource notify message, including an indication to inform the AMF that the aggregated IP enabled data rate of the given UE exceeds or is close to exceeding the UE's capability or supported maximum IP enabled data rate.

After receiving above mentioned information, AMF can deliver this information to the SMF. The SMF can deliver this info to the UPF or to the PCF or to both UPF and PCF. After receiving the information, UPF or PCF can determine whether to modify the UP security policy of existing PDU sessions, for example, by disabling the integrity protection of some PDU sessions to reduce the pressure of UE.

In some embodiments, after receiving the information, the AMF or SMF can also determine whether to modify the existing QoS profile, for example, to a lower QoS level, of some PDU sessions or QoS flows to reduce the required data rate of UE.

Solution 8

In some embodiments where a RAN node can determine that a UE's capability or supported maximum integrity protection enabled data rate has been exceeded, or is close to be exceeded, the RAN node can send a request message to the CN, such as AMF or SMF, to release the UE connection or modify or release PDU sessions or modify or release QoS flows. The request message can include a cause of "UE capability of IP processing is exceeded," or "UE capability of IP processing is close to being exceeded."

The following paragraph(s) provides additional information related to Solution 8.

In some embodiments, a RAN node can calculate the aggregated IP enabled data rate of a given UE. If the RAN node determines that the calculated result exceed or is close to exceeding the UE capability or supported maximum IP enabled data rate, then the RAN node can request the CN, for example, a AMF or SMF or PCF, to modify existing PDU sessions or QoS flows.

In some embodiments, the RAN node can send to the AMF a signaling, such as a PDU Session Resource Modify Indication message, to request modification or releasing of the PDU session or QoS flow with a cause of "UE capability of IP processing is exceeded," or "UE capability of IP processing is risky or close to be exceeded."

Optionally, in some embodiments, the RAN node can send to AMF a signaling, such as a UE Context Release Request message, to request releasing the UE connection with a cause of "UE capability of IP processing is exceeded," or "UE capability of IP processing is risky or close to be exceeded."

Upon receiving above signaling, AMF could inform SMF or PCF with these request and the cause.

Solution 9

In some embodiments, a RAN node can send a message to the CN rejecting or denying a request sent by the CN for a PDU session addition configured with integrity protection or a QoS flow addition configured with integrity protection. The RAN node can inform the CN, such as an AMF or the SMF, of the rejection by sending a message that includes the cause of "exceeds UE capability of IP processing," or "UE capability of IP processing is close to being exceeded"

The following paragraph(s) provides additional information related to Solution 9.

In some embodiments, a RAN node can perform certain operations where a CN send a PDU session addition message to the RAN to request establishing new PDU sessions or QoS flows for a given UE. For example, a RAN node can check whether the PDU session addition or QoS flow addition may cause the aggregate data rate of integrity protection of the given UE to exceed the UE's capability or the UE supported maximum IP enabled data rate. If a RAN node determines that the PDU session addition or QoS flow addition will case the aggregate IP enabled data rate for a given UE to exceed the UE's capability or the UE supported maximum IP enabled data rate, then the RAN node can send a rejection signaling to the CN, for example, an AMF, with a cause of "exceeds UE capability of IP processing," or "UE capability of IP processing is risky or close to be exceeded." After receiving the rejection from RAN, the AMF can send a rejection message with same cause as mentioned above to the SMF.

Solution 10

In some embodiments, a CN can send a message to a RAN node to release a UE connection or release one or more PDU sessions or release one or more QoS flows. The message can include a cause of "UE capability of IP processing is exceeded", or "UE capability of IP processing is close to being exceeded."

Solution 11

In some embodiments, a CN can use signaling to indicate to a RAN node that the "UE capability of IP processing is exceeded," or "UE capability of IP processing is close to being exceeded." As an example, the information about UE's capability being exceeded or being close to being exceeded can be sent by the CN as a signaling indication.

The following paragraph(s) provides additional information related to Solutions 10 and 11.

In some embodiments, if AMF finds that the UE capability of IP processing is exceeded for a given UE, the AMF can provide this information to the RAN node. Optionally, the AMF also can provide this information to the SMF.

The techniques used by the AMF to inform the RAN can include the following two alternatives: (1) The AMF can send a PDU Session Resource Modify Request message or a PDU Session Resource Release Command message to the RAN node where the message includes a cause of "UE capability of IP processing is exceeded," or "UE capability of IP processing is risky or close to be exceeded." (2) The AMF can send a UE Context Release Command to the RAN node where the message includes a cause of "UE capability of IP processing is exceeded", or "UE capability of IP processing is risky or close to be exceeded."

The techniques used by the AMF to inform the SMF can include the following two alternatives: (1) The AMF can send to the SMF a PDU session update message with a cause of "UE capability of IP processing is exceeded," or "UE capability of IP processing is risky or close to be exceeded." (2) The AMF can send to the SMF a PDU session release request message with a cause of "UE capability of IP processing is exceeded," or "UE capability of IP processing is risky or close to be exceeded."

In some other embodiments, if SMF finds that the UE capability of IP processing is exceeded for a given UE, SMF can provide this information to the RAN node. The techniques used by the SMF to inform the RAN node can include the following two alternatives: (1) The SMF can send to the AMF a PDU Session Modification Command message or PDU Session Release Command message with a cause of "UE capability of IP processing is exceeded", or "UE capability of IP processing is risky or close to be exceeded," where the AMF can deliver this message to the RAN. (2) SMF can send to the AMF a UE context release command to with a cause of "UE capability of IP processing is exceeded," or "UE capability of IP processing is risky or close to be exceeded," where the AMF can send this message to the RAN.

Solution 12

In some embodiment, a UE can use, for example, RRC signaling to inform a RAN node that "UE capability of IP processing is exceeded," or "UE capability of IP processing is close to being exceeded." In some other embodiments, the UE can use NAS signaling to inform a CN that "UE capability of IP processing is exceeded," or "UE capability of IP processing is close to being exceeded." The CN can be or can include the AMF, SMF, PCF, or UPF. The information can be carried in the NAS signaling as an indication or as a cause.

The following paragraph(s) provides additional information related to Solution 12.

In some embodiments, if a UE determines that the aggregated UP IP enabled data rate exceed its capability, then the UE can provide this information to the RAN or to the CN.

An example of a technique used by the UE to inform the RAN node can include the UE sending a UE assistance information message to the RAN node, where the message includes an indication of "UE capability of IP processing is exceeded," or "UE capability of IP processing is risky or close to be exceeded."

An example of a technique used by the UE to inform the CN can include the UE sending a NAS message to the AMF or the SMF that includes an indication of "UE capability of IP processing is exceeded," or "UE capability of IP processing is risky or close to be exceeded." Another example of a technique used by the UE to inform the CN can include the UE sending a NAS message to the AMF or SMF to request PDU session modification with a cause of "UE capability of IP processing is exceeded," or "UE capability of IP processing is risky or close to be exceeded."

Solution 13

In some embodiments that relate to a dual-connectivity system, an SN and an MN can exchange information about integrity protected data rate of the UE transmitted to the SN and the MN. One reason for exchanging information is that in some embodiments neither the MN nor the SN know the total data rate of IP of UE. Thus, an exchange of information can help the SN or the MN decide whether each or both can schedule up or down the data rate of some IP enabled DRBs.

In some embodiments, the information related to integrity protected data rate of the UE can be the current aggregated data rate of all the IP enabled DRBs terminated at MN, or the current aggregated data rate of all the IP enabled DRBs terminated at SN. The MN can send to the SN current aggregated data rate of all the IP enabled DRBs terminated at MN, and the SN can send to the MN the current aggregated data rate of all the IP enabled DRBs terminated at SN. The aggregated data rate can be calculated by averaging the aggregated IP enabled data rate during a certain length of time.

In some other embodiments, the information related to integrity protected data rate of the UE exchanged by the MN and SN can be at least one or more of the following: (1) PDU session IDs, or the DRB IDs, or the QoS flow IDs that are IP activated but with no data transferred or scheduled (or the transferring begin again or the transferring status change); (2) an indication of "no integrity protected data is transferring (or the transferring begin again or the transferring status change)"; or (3) a time window during which there is or there is not an integrity protected data transmission. By receiving this information, the receiving node, such as an MN or SN can know whether to raise or reduce the integrity protected data transmission.

The following paragraph(s) provides additional information related to Solution 13.

In some embodiments that relate to a dual-connectivity or multiple connection system, since neither MN or SN can know the whole IP enabled data rate of UE, the SN and MN can exchange the information related to the IP enabled data rate of the UE transmitted by the SN and MN. For example, a MN can send a signaling to the SN that may include the current aggregated IP enabled data rate of the MN terminated bearers of the given UE. In this example, the SN can determine whether the whole IP data rate of the given UE, including the IP data rate of both MN terminated bearers and SN terminated bearers exceeds the UE capability. As another example, the SN can send a signaling to MN that may include the current aggregated IP data rate of SN terminated bearers of the given UE, and the MN can determine whether the whole IP data rate of the given UE exceeds the UE capability.

Optionally, in some embodiments, the MN or SN can send at least one of following information to each other: (1) The PDU session IDs or the DRB IDs or the QoS flow IDs that are IP activated but no data is transferred or scheduled or the transferring begin again; (2) an indication of "no integrity protected data is transferring (or the transferring begin again)"; (3) a time window during which there is (or there is no) integrity protected data transmission. For example, if information is sent related to (2) an indication of "no integrity protected data is transferring (or the transferring begin again), such information can indicate the transferring status of the whole SN. As another example, if information is sent related to (1) and (2), as identified above in this paragraph, then such information can indicate the transferring status of a given PDU sessions or QoS flows.

By receiving this information from SN by the MN, or from the MN by the SN, the MN and SN can know that the integrity protected data transmission terminated at SN and MN, respectively, is up or down or even stop. Based on this information, the MN or SN can determine whether to raise or reduce the integrity protected data transmission terminated at MN or SN.

Solution 14

In some embodiments that relate to a dual-connectivity system, an MN can request SN to raise or decrease the IP data rate of the SN, or the MN can explicitly indicate to the SN the one or more PDU sessions or one or more QoS flows or one or more DRBs for which the SN should increase or decelerate the data rate. In such embodiments, the MN can know whether the total IP data rate of the UE exceed the UE capability. As an example, the MN can get such information from a CN or from a UE, as described in any one of Embodiments 10, 11 and 12. In some embodiments, the SN may inform the MN as to which PDU session or QoS flow or DRB of SN are IP activated during the SN addition or SN modification procedure where some PDU sessions or QoS flows can be offloaded to SN and where the one or more DRBs of SN are setup.

The following paragraph(s) provides additional information related to Solution 14.

In some embodiments that relate to a dual-connectivity or multiple connection system, a MN can obtain information from a CN or a UE to determines whether the UE capability or supported IP enabled data rate is exceeded or nearly exceeded. If the MN determines that the UE capability or supported IP enabled data rate is exceeded or nearly exceeded, then the MN can send signaling to the SN. An example of the signaling used by the MN can include a SN modification request including the modification or release requests of PDU sessions or QoS flows. The signaling from the MN to the SN can include at least one of following information:

(1) An indication to indicate to the SN to raise or decrease the IP data rate, (2) Optionally, a specific value or a specific percentage to indicate to SN by how much to raise or decrease the IP data rate;

(3) The one or more identities of the PDU sessions or one or more identities of the QoS flows or the one or more identities of the DRB for which the SN should raise or decrease the data rate. These PDU session or QoS flow or DRB were IP enabled.

Solution 15

In some embodiments that relate to a dual-connectivity system, an MN can send to an SN a threshold for the aggregate IP enabled data rate of the UE. The aggregated IP enabled data rate may describe the IP enabled data rate of all of the one or more DRBs (or SN terminated bearers) of a given UE. The SN can use this threshold information to adjust or control the IP enabled data rate of the one or more DRBs of the given UE so that the aggregate IP data rate of the SN terminated bearers of the given UE does not exceed the threshold. For example, SN can adjust or control the IP enabled data rate of the one or more DRBs of a UE so that the aggregate IP enabled data rate of the SN terminated bearers of the UE is less than or equal to the threshold. As another example, the SN may have a scheduler that may schedule downlink transmission to a UE at a data rate that not exceed a threshold during a certain time period. As yet another example, the SN can send an error message after receiving a request for additional data rate. In such an embodiment, the MN can control the aggregate IP enabled data rate of SN below a certain threshold.

In some embodiments, the threshold provided by the MN to the SN can also include one or more thresholds associated with each PDU session or each QoS flow or each DRB. As an example, each IP activated PDU session or QoS flow or DRB of the SN of the given UE can have a corresponding threshold. MN assigns and sends to the SN one or more thresholds of IP enabled data rate of each IP activated PDU session or QoS flow or DRB together with the identities of the corresponding PDU session or QoS flow or DRB. One benefit of having the MN send to the SN one or more thresholds for each PDU session or each QoS flow or each DRB is that MN can have a more precise control on the IP enabled data rate adjusted or controlled by the SN terminated bearers.

The following paragraph(s) provides additional information related to Solution 15.

In some embodiments that relate to a dual-connectivity or multiple connection system, a MN can send to the SN a SN addition request message or a SN modification request message where the message can include a threshold of the SN guaranteed aggregate IP data rate of the given UE. The SN use this information to determine or ensure that the aggregate IP data rate of SN terminated bearers does not exceed the threshold. One benefit of this embodiment is that the MN can control the aggregate data rate of IP of SN below a certain threshold.

In some embodiments, the threshold information provided by the MN can be provided by the MN for each PDU session or each QoS flow, or each DRB. Thus, each IP activated PDU session or QoS flow or DRB of the SN of the given UE can have a corresponding threshold. The MN can assign to SN one or more thresholds of IP data rate for each IP activated PDU session or for each QoS flow or for each DRB along with the identities of the corresponding PDU session or QoS flow or DRB. One benefit of such an embodiment is that an MN can have more precise control on the IP data rate of the SN terminated bearers.

Solution 16

In some embodiments, a RAN node can inform the CN with the per-PDU-session or per-QoS-flow supported maximum data rate for integrity protection. After the CN receives such information, the CN can limit the data throughput at the CN side. Furthermore, in some embodiment that relate to DC, MN can obtain from the SN the per-PDU-session or per-QoS-flow supported maximum integrity protection data rate of the SN terminated PDU sessions or SN terminated QoS flows.

The following paragraph(s) provides additional information related to Solution 16.

If the RAN node receives the PDU session resource setup message from CN, the message can include the UP security policy of each PDU session that can require the RAN node to establish the PDU sessions with required UP security policy. For example, the RAN node can use the UP security policy to determine which PDU session should activate the encryption and/or integrity protection. In some embodiment, the RAN can respond to the CN with the per-PDU-session or per-QoS-flow supported maximum data rate of encryption or integrity protection, upon which the CN can limit the data throughput at CN side.

Furthermore, if the RAN node adds a SN, e.g., in case of DC and the RAN node becomes a MN, then the MN can obtain the per-PDU-session or per-QoS-flow or per-DRB supported maximum integrity protection data rate of the SN terminated PDU sessions or SN terminated QoS flows or DRBs from SN side. Based on the information obtained by the MN, the MN can calculate the total per-PDU-session or per-QoS-flow or per-DRB supported maximum data rate of encryption or integrity protection.

Solution 17

In some embodiments, during or before the PDU session setup procedure, a RAN node can obtain at least one of the following information to determine which of the one or more PDU sessions can be admitted and also to determine which of the one or more PDU sessions can be security activated or deactivated:

(1) Resource allocation priority or admission priority of each PDU session that can be used to indicate what PDU session should be admitted with priority.

(2) Security priority of each PDU session that can be used to indicate which PDU session has higher security protection requirement and can be security activated with priority and which PDU session has lower security protection requirement and can be security deactivated.

(3) The user preference for security or non-security that can be used to indicate to the RAN node whether the user prefers security protection or not. The user security preference can be indicated with per PDU session granularity or per QoS flow granularity.

(4) The user preference between security and higher QoS level that can be used to indicate to the RAN node whether the user prefers security protection or prefers higher QoS level. The user preference could be indicated with per PDU session granularity or per QoS flow granularity.

The information described above in (1) to (4) in Solution 17 can be obtained by the RAN node from a CN or from a UE.

The following paragraph(s) provides additional information related to Solution 17.

During or before the PDU session setup procedure, the RAN node may need to obtain at least one of the following information to determine which PDU session can be admitted and further which PDU session should be security activated or deactivated:

(1) Resource allocation priority or admission priority of each PDU session, which is used to indicate which PDU session should be admitted with priority.

(2) Security priority of each PDU session, which is used to indicate which PDU session has higher security protection requirement and should be security activated with priority and which PDU session has lower security protection requirement and could be security deactivated.

(3) The user preference of security or non-security, which is used to indicate the RAN that whether the user prefer security protection or not, furthermore the said user preference could be indicated with per PDU session granularity or per QoS flow granularity.

(4) The user preference of security or higher QoS level, which is used to indicate the RAN that whether the user prefer security protection or prefer higher QoS level, furthermore the said user preference could be indicated with per PDU session granularity or per QoS flow granularity.

The RAN can obtain the above information in (1) to (4) in this solution from CN or from UE. For example, the above information can be included in the PDU session setup request or PDU session modification request message sent from CN to the RAN node, or the above information can be included in the RRC signaling, such as RRC connection setup request or RRC connection setup complete.

III. Issue 3—Handing of Integrity Protection or Encryption Mechanisms in a Dual-Connectivity System The solutions described for Issue 3 can relate to MN and SN handling for a DC system where a CN can determine a UP security policy that can allow a RAN node to entirely or partly enable a PDU session to activate integrity protection and/or encryption protection. In such embodiments, a SN may not know the UP security policy and which PDU sessions or QoS flows assigned to SN are to be IP activated and encryption activated.

Solution 18

In some embodiments that relate to a dual-connectivity system, a MN can send a configuration information that can include one or more IP activation or deactivation indication with granularity of per QoS flow. As an example, the MN can sent to the SN the identities of the one or more QoS flows that can activate IP. Optionally, the configuration information can include encryption activation or deactivation indication with granularity of per QoS flow. For example, the MN can send to the SN the identities of the one or more QoS flows that can activate encryption.

The following paragraph(s) provides additional information related to Solution 18.

Currently, CN can send a User Plane (UP) security policy to the RAN that indicates which PDU session of a given UE can be enabled for integrity protection. In some embodiments, the UP security policy can specify whether integrity protection is a mandatory or optional. For example, if the UP security policy indicates that the integrity protection of a given PDU session is preferred or optional, then the RAN node can determine whether or not to enable the IP for the given PDU session. Further, in some embodiments, the UP security policy can specify whether encryption (also known as ciphering) is a mandatory or optional. For example, if the UP security policy indicates that the encryption of a given PDU session is preferred or optional, then the RAN node can determine whether or not to enable encryption for the given PDU session.

In some embodiments that relate to Dual-Connectivity system, a SN may not know which QoS flow in the given PDU session could be IP enabled or not. In such embodiments, a MN can receive a UP security policy from CN which indicates the PDU session IDs and a value that indicates a preference for the corresponding encryption and integrity protection activation. For example, if the value of the preference is associated with "preferred," then the activation preference of encryption or integrity protection is suggested or optional, and not mandatory. If the activation preference of encryption or integrity protection is optional, then the MN can determine whether to enable encryption or IP or both encryption and IP for the given PDU sessions. In some embodiments, the MN can also determine whether to enable encryption or IP or both encryption and IP for any one or more of the QoS flows in the given PDU session. Next, the MN may send to the SN a message, such as a SN addition request or SN modification request, where the message may include the QoS flow IDs of each PDU session assigned to SN and the encryption and/or IP enablement indications which corresponds to the QoS flow IDs to indicate which QoS flow should be encryption and/or IP activated.

Solution 19

In some embodiments that relate to a dual-connectivity system, a MN can sends to SN a user plane (UP) security policy of one or more PDU sessions assigned to SN where the CN can configure the UP security policy per-PDU session or for each PDU session. In some embodiments, the UP security policy can be configured by CN and the MN may not be able to modify it. The SN can decide which of the one or more PDU sessions or which of the one or more QoS flows of each PDU session may activate or deactivate any one or more of (1) IP and (2) encryption based on the UP security policy. The SN can send to MN a feedback that may include a result of the SN's decision of the UP security (IP and/or encryption) activation/deactivation of each of the one or more PDU sessions or the one or more QoS flows or one or more DRBs of SN. For example, the SN can send to the MN a list of identifiers of one or more PDU sessions or one or more QoS flows or one or more DRBs terminated on SN, and the corresponding IP or encryption activation/deactivation decision. The SN can also send to the UE via SRB3 signaling the SN's decision of the IP or encryption activation/deactivation of the SN terminated DRBs. SRB3 is a Signaling Radio Bearer between SN and UE.

As an example, the MN can send to SN the UP security policy if the value of UP security policy of a PDU session which are assigned to SN is "integrity is preferred" that indicates that the integrity is non-enforcement for this PDU session. Next, based on the UP security polity, the SN can determine which of the one or more QoS flows of the PDU session to activate IP and which of the one or more QoS flows to deactivate.

As another example, the MN can send to SN the UP security policy if the value of UP security policy of a PDU session which are assigned to SN is "encryption is preferred" that indicates that the encryption is non-enforcement for this PDU session. Next, based on the UP security polity, the SN can determine which of the one or more QoS flows of the PDU session to activate encryption and which of the one or more QoS flows to deactivate.

The following paragraph(s) provides additional information related to Solution 19.

When some PDU sessions are determined to be established by a CN, the MN can receive the User Plane (UP) security policy of the to-be-setup PDU sessions from CN. The UP security policy can indicate to the MN the PDU session IDs and the corresponding encryption and integrity protection activation or deactivation preference.

If the MN decides to offload some of the PDU sessions to SN, the MN can send to the SN a message, for example, a SN addition request or a SN modification request. The message may include the PDU sessions IDs assigned to SN and the corresponding UP security policy of the PDU sessions, in which UP security policy of each PDU session is received from CN, and whether the MN cannot modify the value of the UP security policy and just deliver it to SN. In some embodiments, MN may not be allowed to modify the UP security policy so that a SN can determine its own security activation/deactivation. In some other embodiments, the MN can modify the UP security policy so that the SN cannot modify the UP security policy and follows the instructions in the MN provided UP security policy.

The SN can comply with the received UP security policy if the security policy value is mandatory. For example, if a value for integrity protection indication is set to 'required' or 'not-needed,' then the corresponding PDU session or QoS flow may activate or deactivate integrity protection, respectively. If the UP security policy is not mandatory, for example, having a value of 'preferred,' then the SN can determine which PDU session or which QoS flows of the PDU session should activate encryption or IP or both encryption and IP and which PDU session or QoS flows should deactivate encryption or IP or both encryption and IP.

After SN determines UP security activation or deactivation for each PDU session offloaded to SN, SN can send to a MN a feedback. The feedback may be sent, for example, using a SN addition response message or a SN modification response message. The feedback may include the SN's decision of the UP security (IP and/or encryption) activation/deactivation of the PDU sessions or QoS flows of SN.

In some embodiments, the SN can send the UP security (IP and/or encryption) activation/deactivation of the SN terminated DRBs to the corresponding UE using SRB3 signaling. For example, the SN can send a RRC connection Reconfiguration message via SRB3.

Solution 20

In some embodiments that relate to a dual-connectivity system, when a MN receives the UP security policy of the to-be-setup PDU sessions, the MN can determine the security (IP and/or encryption) activation/deactivation for all of the one or more PDU sessions based on the received UP security policy. If some of the PDU sessions are determined to be offloaded to SN, the MN can send to SN the corresponding UP security activation/deactivation determined by the MN. The SN can comply with the MN determined UP security activation/deactivation for each offloaded PDU session.

The following paragraph(s) provides additional information related to Solution 20.

When some PDU sessions are decided to be established by CN, the MN can receive the User Plane (UP) security policy of the to-be-setup PDU sessions from CN. The UP security policy can indicate to the MN the PDU session IDs and the corresponding encryption and integrity protection activation or deactivation preference.

In some embodiments, the MN can decide the UP security (IP and/or encryption) activation/deactivation for all the PDU sessions or all the QoS flows based on the received UP security policy. If MN decide to offload some of the PDU sessions or some of the QoS flows to SN, the MN may send to the SN a message, for example, a SN addition request or SN modification request, in which the message can include the PDU sessions IDs or QoS flow IDs assigned to SN and the corresponding MN decided UP security activation/deactivation of each PDU session or each QoS flow.

The SN can comply with the received UP security policy activation or deactivation for each PDU session or each QoS flow assigned to SN.

The following paragraph(s) provides additional information related to Solutions 19 and 20.

In some embodiments that relate to a dual-connectivity system, for the non-split PDU session offloaded to SN, the MN can send to SN the UP security policy that is received from CN without modification. As explained in this patent document, for the security value of 'Required' or 'Not-Needed', SN can comply with it, whereas for the security value of 'Preferred', SN can determine the UP security activation/deactivation.

For the PDU session split to MN and SN, for simplicity, the security policy of the PDU session can be determined by MN in case the policy value received from CN is 'preferred.' The MN can send to SN the MN decided UP security indication of the split PDU session with value 'Required' where the MN decide to activate the security or with the value of 'Not-needed' where the MN decide to deactivate the security. In this way, the MN can send a modified UP security policy to SN in case the original UP security policy sent by CN is 'preferred.'

Solution 21

In some embodiments, a RAN node may receive a UP security policy configuration for a given UE from a CN. In such embodiments, the RAN node may send a response to CN in which the response includes one or more decisions about the RAN determined UP security (e.g., any one or more of an IP, encryption) activation/deactivation per PDU session or per QoS flow for the given UE. Furthermore, the RAN node may also notify the CN with one or more updated decisions if RAN changes the UP security (any one or more of IP and encryption) activation/deactivation per PDU session or per QoS flow. For example, the one or more decisions (or updated decisions) may include information such as a list of identifiers of one or more PDU sessions or one or more QoS flows, and the corresponding IP or encryption activation/deactivation decision.

The following paragraph(s) provides additional information related to Solution 21.

Upon receiving the UP security policy configuration of a given UE from the CN, the RAN node can send response to CN in which the response can include the RAN decision of the UP security (IP and/or encryption) activation/deactivation per PDU session or per QoS flow of the given UE. In some embodiments, the RAN node can notify the CN with the updated UP security decision if RAN changed the UP security (IP and/or encryption) activation/deactivation per PDU session or per QoS flow.

Figure 8:
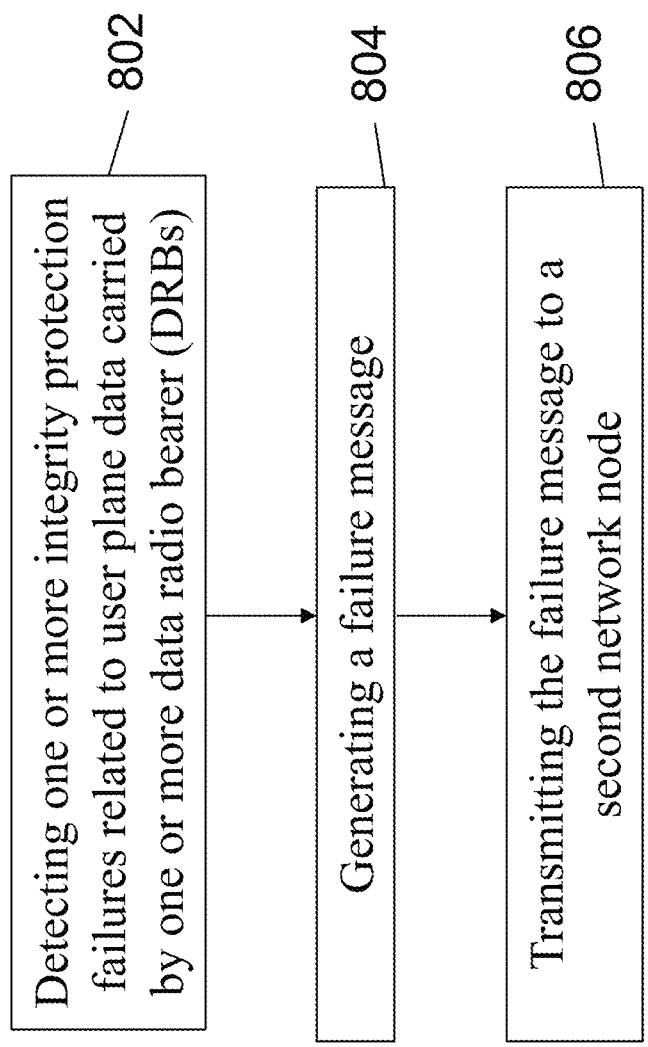
FIG. 8 shows an exemplary flowchart for detecting integrity protection failure.

FIG. 8 shows an exemplary flowchart for detecting integrity protection failure. At the detecting operation 802, a first network node detects one or more integrity protection failures related to user plane data carried by one or more data radio bearers (DRBs). At the generating operation 804, the first network node generates a failure message. At the transmitting operation 806, the first network node transmits the failure message to a second network node. Additional details and embodiments for these methods are described with respect to FIGS. 2 to 7.

In some embodiments where the first network node is a user equipment and the second network node is a core network, the failure message is transmitted using a non-access stratum (NAS) signaling technique.

In some embodiments, the first network node is a radio access network (RAN) node and the second network node is a user equipment.

In some embodiments, the failure message includes at least one of (1) a number of detected integrity protection failures, and (2) one or more reasons for the one or more integrity protection failures. The failure message can be transmitted in response to determining that a number of detected integrity protection failures has reached a predetermined number of failures. Further, the number of detected integrity protection failures can be provided per user equipment, per quality of service (QoS) flow, per packet data unit (PDU) session, per DRB, or per service flow. The one or more reasons can include an attack, a packet data convergence protocol (PDCP) counts desynchronization, or a cyclic redundancy check (CRC) bits error.

In some embodiments where first network node is a RAN node and the second network node is a user equipment, the method further comprises transmitting, by the RAN node, a DRB release message to the user equipment to release the one or more DRBs related to the one or more integrity protection failures.

In some other embodiments, the first network node is a radio access network (RAN) node and the second network node is a core network. For embodiments where the core network is the second network node, the core network includes an Access and Mobility Management Function (AMF), a user plane function (UPF), or a session management function (SMF), where the failure message is provided to the AMF, the UPF, or the SMF. In some embodiments, the AMF receives the failure message and provides the failure message to the SMF or a policy control function (PCF). In some embodiments, the core network provides or transmits the failure message to a user equipment.

In some embodiments, the first network node is a secondary node and the second network node is a master node, where the secondary node and the master node operate in a dual connectivity system. In some embodiments that relate to a dual connective system, the method of FIG. 8 can further include transmitting, by the secondary node to the master node, a modification message that includes any one or more of a key refresh, a modification or release of the one or more DRBs, a release of quality of service (QoS) flow, and a release of packet data unit (PDU) session.

Figure 9:
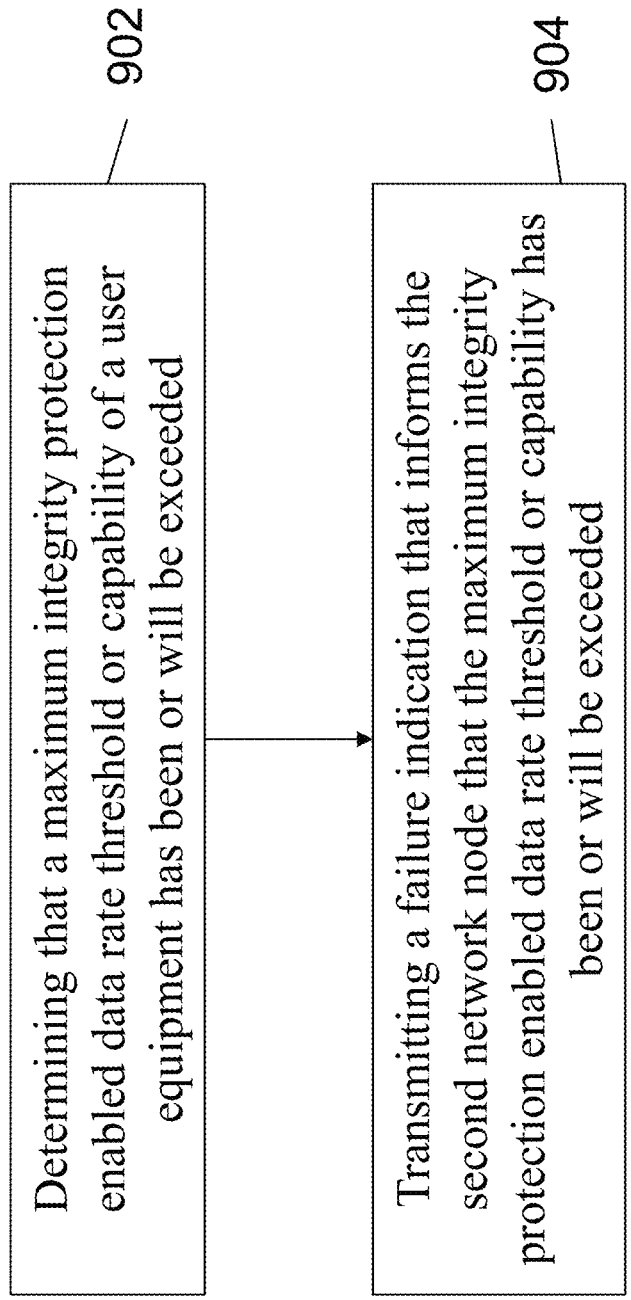
FIG. 9 shows an exemplary flowchart for managing an integrity protection enabled data rate that has been or will be exceeded.

FIG. 9 shows an exemplary flowchart for managing an integrity protection enabled data rate that has been or will be exceeded. At the determining operation 902, a first network node determines that a maximum integrity protection enabled data rate threshold or capability of a user equipment has been or will be exceeded. At the transmitting operation 904, the first network node transmits to a second network node a failure indication that informs the second network node that the maximum integrity protection enabled data rate threshold or capability has been or will be exceeded.

In some embodiments, the first network node is a radio access network (RAN) node and the second network node is a core network that may include an Access and Mobility Management Function (AMF), a session management function (SMF), a policy control function (PCF), or a user plane function (UPF). In some embodiments, the method of FIG. 9 further includes sending, by the RAN node, a message to the core network, wherein the message includes information indicative of any one of: (1) a request to release a connection for the user equipment, modify or release a packet data unit (PDU) session, or modify or release a quality of service (QoS) flow, and (2) a denial of the core network initiated request for a packet data unit (PDU) session addition or a request for a quality of service (QoS) flow addition. In some embodiments related to FIG. 9, the failure indication provided to the AMF is sent to the SMF. In some other embodiments related to FIG. 9, the failure indication provided to the SMF is sent to the PCF.

Figure 10:
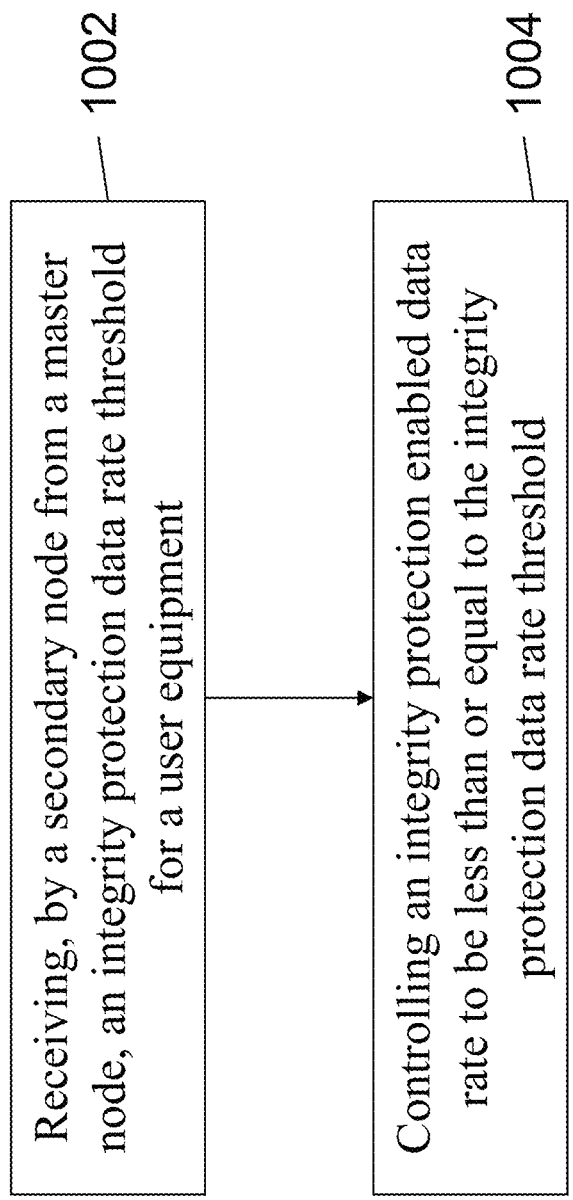
FIG. 10 shows an exemplary flowchart for managing a data rate of one or more DRBs of a secondary node in a dual-connectivity system.

FIG. 10 shows an exemplary flowchart for managing a data rate of one or more DRBs of a secondary node in a dual-connectivity system. At the receiving operation 1002, a secondary node receives from a master node an integrity protection data rate threshold for a user equipment. At the controlling operation 1004, an integrity protection enabled data rate is controlled by the secondary node to be less than or equal to the integrity protection data rate threshold, where the integrity protection enabled data rate is allocated to the user equipment on one or more data radio bearers (DRBs) terminated at the secondary node.

Figure 11:
FIG. 11 shows an exemplary flowchart for performing a packet data unit (PDU) setup.

FIG. 11 shows an exemplary flowchart for performing a packet data unit (PDU) setup. At the performing operation 1102, a base station performs a packet data unit (PDU) session setup comprising one or more PDU sessions. During or before the PDU session setup, the base station receives from a core network or a user equipment at least one of: a resource allocation priority or admission priority for each PDU session, a security priority for each PDU session, a user security preference, and a user preference between security and quality of service (QoS) level.

In some embodiments, the user security preference is indicated for each PDU session or for each QoS flow, and the user preference between security and QoS level is indicated for each PDU session or for each QoS flow.

In some embodiments, the base station of FIG. 11 is a radio access network (RAN) node.

Figure 12:
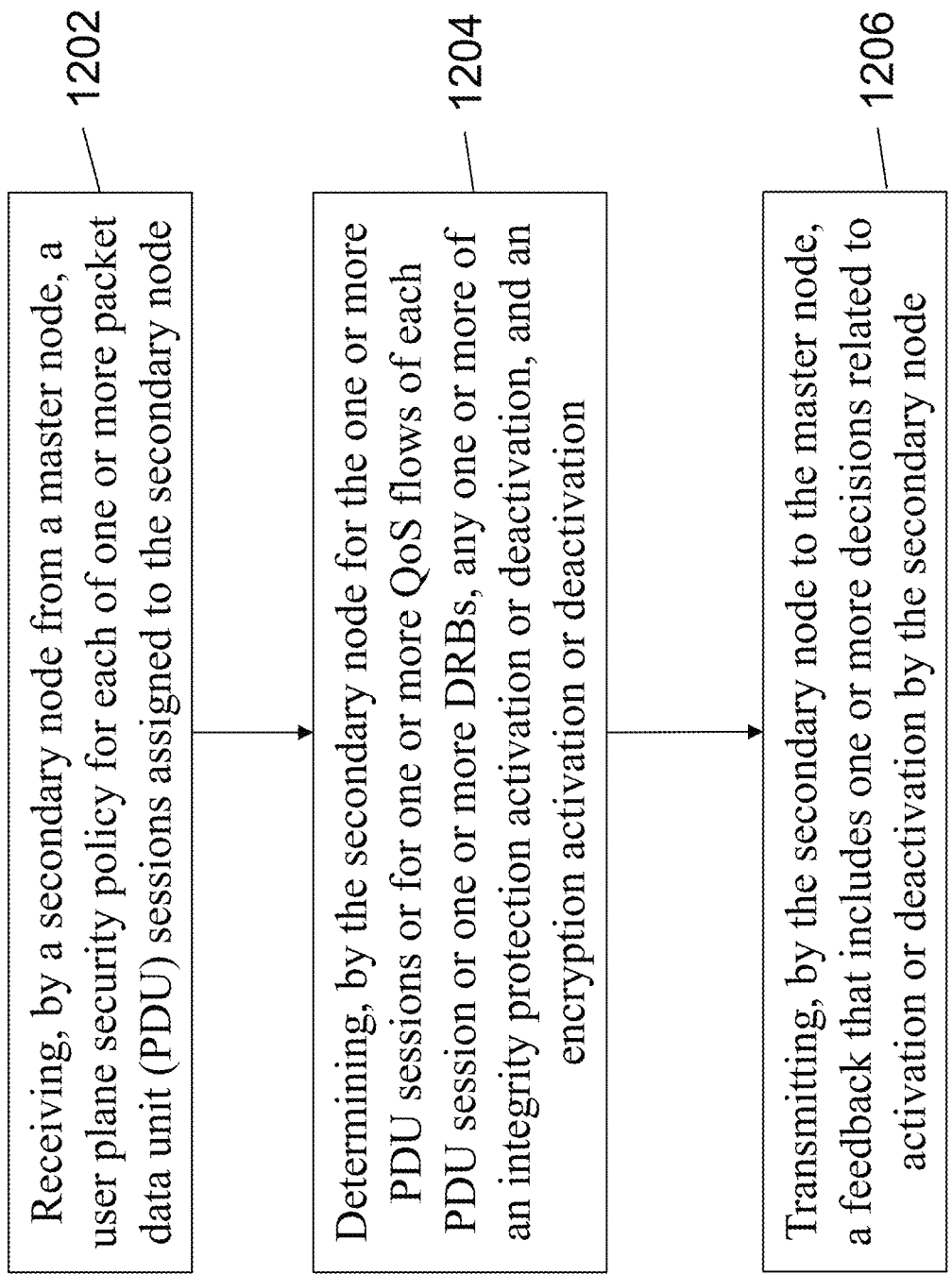
FIG. 12 shows an exemplary flowchart for activation or deactivating any one or more of integrity protection and encryption.

FIG. 12 shows an exemplary flowchart for activation or deactivating any one or more of integrity protection and encryption. At the receiving operation 1202, a secondary node receives from a master node a user plane security policy for each of one or more packet data unit (PDU) sessions assigned to the secondary node, wherein the user plane security policy is configured by a core network. At the determining operation 1204, the secondary node determines for the one or more PDU sessions or for one or more QoS flows of each PDU session or one or more DRBs, any one or more of (1) an integrity protection activation or deactivation, and (2) an encryption activation or deactivation. The secondary node performs the determining operation 1204 based on the user plane security policy. At the transmitting operation 1206, the secondary node transmits to the master node a feedback that includes one or more decisions related to activation or deactivation by the secondary node.

In some embodiments, the feedback includes a list of identifiers of one or more PDU sessions or one or more QoS flows or one or more DRBs terminated on the secondary node, wherein each identifier is associated with information about any one or more of (1) the integrity protection activation or deactivation, and (2) the encryption activation or deactivation.

In some embodiments, the method of FIG. 12 further includes transmitting, by the secondary node to a user equipment, the one or more decisions. In some embodiments, the one or more decisions are transmitted to the user equipment using SRB3 signaling.

Figure 13:
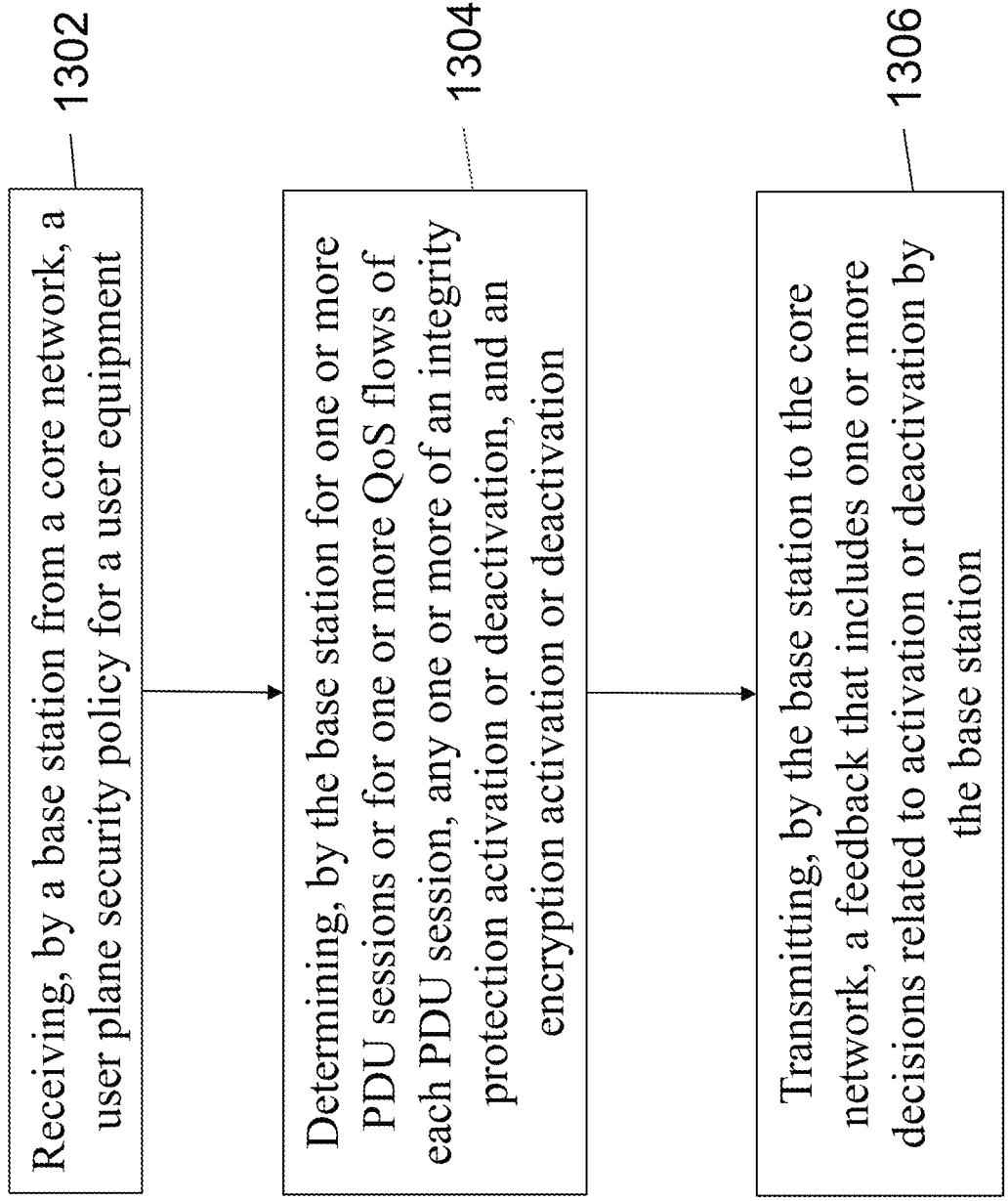
FIG. 13 shows another exemplary flowchart for activation or deactivating any one or more of integrity protection and encryption.

FIG. 13 shows another exemplary flowchart for activation or deactivating any one or more of integrity protection and encryption. At the receiving operation 1302, a base station receives from a core network, a user plane security policy for a user equipment. At the determining operation 1304, the base station determines for one or more PDU sessions or for one or more QoS flows of each PDU session, any one or more of (1) an integrity protection activation or deactivation, and (2) an encryption activation or deactivation. The base station performs the determining operation 1304 based on the user plane security policy. At the transmitting operation 1306, the base station transmits to the core network a feedback that includes one or more decisions related to activation or deactivation by the base station.

In some embodiments, the method of FIG. 13 further includes changing, by the base station, for the one or more PDU sessions or for the one or more QoS flows of each PDU session, any one or more of (1) the integrity protection activation or deactivation, and (2) the encryption activation or deactivation. In such embodiments, the base station transmits to the core network a feedback that includes one or more updated decisions related to the changed activation or deactivation by the base station. In some embodiments, the base station of FIG. 13 is a radio access network (RAN) node.

Figure 14:
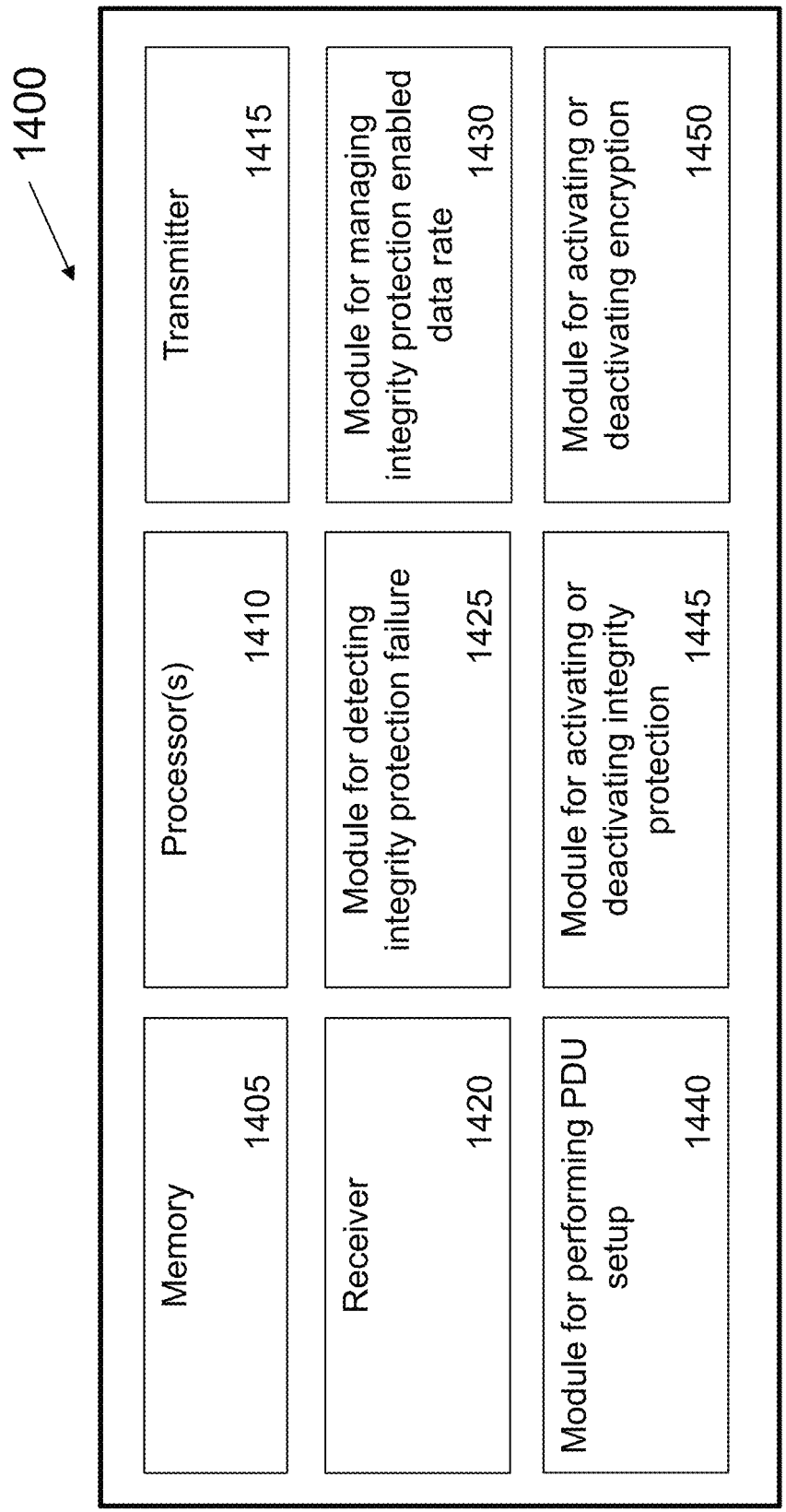
FIG. 14 shows an exemplary block diagram of a communication node.

FIG. 14 shows an exemplary block diagram of a communication node 1400. The communication node can include a user equipment, a base station, a RAN node, a master node in a dual-connectivity system, a secondary node in a dual-connectivity system, or a core network. The communication node 1400 includes at least one processor 1410 and a memory 1405 having instructions stored thereupon. The instructions upon execution by the processor 1410 configure the communication node 1400 to perform the operations described in FIGS. 8 to 13 and in the various solutions described in this patent document. The transmitter 1415 transmits or sends information or data to another communication node. The receiver 1420 receives information or data transmitted or sent by another communication node.

The module for detecting integrity protection failure 1425 performs the operations described in FIG. 8. Alternatively, or additionally, the module for detecting integrity protection failure 1425 can perform one or more integrity protection failure detection features as described in Issue 1.

The module for managing integrity protection enabled data rate 1430 performs the operations described in FIG. 9 or 10. Alternatively, or additionally, the module for managing integrity protection enabled data rate 1430 can perform one or more integrity protection enabled data rate management features as described in Issue 2.

The module for performing PDU setup 1440 performs the operations described in FIG. 11. Alternatively, or additionally, the module for performing PDU setup 1440 can perform one or more PDU setup related features as described in Issue 2.

The module for activating or deactivating integrity protection 1445 performs the integrity protection related operations described in FIG. 12 or 13. Alternatively, or additionally, the module for activating or deactivating integrity protection 1445 can perform one or more integrity protection activation or deactivation related features as described in Issue 3.

The module for activating or deactivating encryption 1450 performs the encryption related operations described in FIG. 12 or 13. Alternatively, or additionally, the module for activating or deactivating encryption 1450 can perform one or more encryption activation or deactivation related features as described in Issue 3.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    receiving, by a base station from a core network, a user plane security policy for a packet data unit (PDU) session;
    determining, by the base station, whether to activate or deactivate a user plane security for the PDU session,
    wherein the determining is performed based on the user plane security policy,
    wherein whether the user plane security for the PDU session is activated or deactivated is determined in response to the user plane security policy indicating that the user plane security is preferred;
    transmitting, by the base station to the core network, a notification that includes a decision related to whether the user plane security is activated or deactivated for the PDU session;
    changing, by the base station, an activation or a deactivation of the user plane security for the PDU session; and
    transmitting, by the base station to the core network, another notification that includes an updated decision related to whether the activation or the deactivation of the user plane security is changed by the base station.

2. The method of claim 1, wherein the notification includes an identifier for the PDU session, wherein the identifier is associated with the one or more decisions for the PDU session.

3. The method of claim 1,
    wherein the user plane security is activated in response to the user plane security policy indicating that the user plane security is required, and,
    wherein the user plane security is deactivated in response to the user plane security policy indicating that the user plane security is not-needed.

4. An apparatus for wireless communication configured to perform operations, comprising:
    receiving, by a base station from a core network, a user plane security policy for a packet data unit (PDU) session;
    determining, by the base station, whether to activate or deactivate a user plane security for the PDU session,
    wherein the determining is performed based on the user plane security policy,
    wherein whether the user plane security for the PDU session is activated or deactivated is determined in response to the user plane security policy indicating that the user plane security is preferred;
    transmitting, by the base station to the core network, a notification that includes a decision related to whether the user plane security is activated or deactivated for the PDU session;
    changing, by the base station, an activation or a deactivation of the user plane security for the PDU session; and
    transmitting, by the base station to the core network, another notification that includes an updated decision related to whether the activation or the deactivation of the user plane security is changed by the base station.

5. The apparatus of claim 4, wherein the notification includes an identifier for the PDU session, wherein the identifier is associated with the one or more decisions for the PDU session.

6. The apparatus of claim 4,
wherein the user plane security is activated in response to the user plane security policy indicating that the user plane security is required, and,
wherein the user plane security is deactivated in response to the user plane security policy indicating that the user plane security is not-needed.

7. A non-transitory computer-readable medium including executable instructions that when executed by at least one processor, perform operation comprising:
receiving, by a base station from a core network, a user plane security policy for a packet data unit (PDU) session;
determining, by the base station, whether to activate or deactivate a user plane security for the PDU session, wherein the determining is performed based on the user plane security policy,
wherein whether the user plane security for the PDU session is activated or deactivated is determined in response to the user plane security policy indicating that the user plane security is preferred;
transmitting, by the base station to the core network, a notification that includes a decision related to whether the user plane security is activated or deactivated for the PDU session;
changing, by the base station, an activation or a deactivation of the user plane security for the PDU session; and
transmitting, by the base station to the core network, another notification that includes an updated decision related to whether the activation or the deactivation of the user plane security is changed by the base station.

8. The computer-readable medium of claim 7, wherein the notification includes an identifier for the PDU session, wherein the identifier is associated with the one or more decisions for the PDU session.

9. The computer-readable medium of claim 7,
wherein the user plane security is activated in response to the user plane security policy indicating that the user plane security is required, and,
wherein the user plane security is deactivated in response to the user plane security policy indicating that the user plane security is not-needed.

10. The method of claim 1, wherein the user plane security includes integrity protection.

11. The method of claim 1, wherein the user plane security includes encryption.

12. The apparatus of claim 4, wherein the user plane security includes integrity protection.

13. The apparatus of claim 4, wherein the user plane security includes encryption.

14. The non-transitory computer-readable medium of claim 7, wherein the user plane security includes integrity protection.

15. The non-transitory computer-readable medium of claim 7, wherein the user plane security includes encryption.

* * * * *

UNITED STATES PATENT AND TRADEMARK OFFICE
CERTIFICATE OF CORRECTION

PATENT NO. : 11,711,455 B2
APPLICATION NO. : 17/061303
DATED : July 25, 2023
INVENTOR(S) : Dai et al.

Page 1 of 1

It is certified that error appears in the above-identified patent and that said Letters Patent is hereby corrected as shown below:

In the Specification

In Column 4, Line 23, delete "plane" and insert -- Plane --

In Column 5, Line 1, delete "handing" and insert -- handling --

In Column 5, Line 14, delete "(DRB)" and insert -- (DRBs) --

In Column 5, Line 24, delete "kBps." and insert -- kbps. --

In Column 5, Line 29, delete "data has does" and insert -- data does --

In Column 6, Line 10, delete "can transmitted" and insert -- can be transmitted --

In Column 11, Line 24, delete "ask release" and insert -- ask to release --

In Column 14, Line 66, delete "case" and insert -- cause --

In Column 16, Line 64, delete "or" and insert -- nor --

In the Claims

In Column 30, Line 5, in Claim 8, delete "computer-readable medium" and insert -- non-transitory computer-readable medium --

In Column 30, Line 9, in Claim 9, delete "computer-readable medium" and insert -- non-transitory computer-readable medium --

Signed and Sealed this
Fifth Day of September, 2023

Katherine Kelly Vidal
*Director of the United States Patent and Trademark Office*